United States Patent
Matsukizono

(10) Patent No.: US 9,513,522 B2
(45) Date of Patent: Dec. 6, 2016

(54) LIQUID CRYSTAL DISPLAY PANEL AND LIQUID CRYSTAL DISPLAY DEVICE INCLUDING SAME

(75) Inventor: Hiroshi Matsukizono, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 149 days.

(21) Appl. No.: 14/009,602

(22) PCT Filed: Apr. 2, 2012

(86) PCT No.: PCT/JP2012/058893
§ 371 (c)(1),
(2), (4) Date: Oct. 3, 2013

(87) PCT Pub. No.: WO2012/137721
PCT Pub. Date: Oct. 11, 2012

(65) Prior Publication Data
US 2014/0022477 A1    Jan. 23, 2014

(30) Foreign Application Priority Data

Apr. 7, 2011   (JP) .................................. 2011-085822

(51) Int. Cl.
*G02F 1/136* (2006.01)
*G02F 1/1362* (2006.01)
*G02F 1/1368* (2006.01)

(52) U.S. Cl.
CPC ....... *G02F 1/136286* (2013.01); *G02F 1/1368* (2013.01); *G02F 2201/52* (2013.01)

(58) Field of Classification Search
CPC   G02F 1/1368; G02F 1/1335; G02F 1/136277; G02F 1/136286; G02F 2201/52

(Continued)

(56) References Cited

U.S. PATENT DOCUMENTS

| | | | | |
|---|---|---|---|---|
| 7,964,876 B2* | 6/2011 | Umezaki | ............. | H01L 27/1255 |
| | | | | 257/72 |
| 2009/0002614 A1* | 1/2009 | Lien | .................. | G02F 1/134336 |
| | | | | 349/123 |

(Continued)

FOREIGN PATENT DOCUMENTS

| JP | 2001-091971 A | 4/2001 |
|---|---|---|
| JP | 2007-250984 A | 9/2007 |

OTHER PUBLICATIONS

Official Communication issued in International Patent Application No. PCT/JP2012/058893, mailed on Jun. 26, 2012.

*Primary Examiner* — Nathanael R Briggs
*Assistant Examiner* — William Peterson
(74) *Attorney, Agent, or Firm* — Keating & Bennett, LLP

(57) ABSTRACT

There is provided a liquid crystal display panel that improves the reliability of thin film transistors while suppressing a degradation in display quality. A G TFT (120g) connected at its drain electrode (125d) to a G pixel electrode (130g) is disposed on the opposite side of the G pixel electrode (130g) from a B pixel electrode (130b). The distance between a B TFT (120b) connected at its drain electrode (125d) to the B pixel electrode (130b) and the B pixel electrode (130b) is greater than the distance between the G TFT (120g) connected at its drain electrode (125d) to the G pixel electrode (130g) and the G pixel electrode (130g). The distance between an R TFT (120r) connected at its drain electrode (125d) to an R pixel electrode (130r) and the B pixel electrode (130b) is greater than the distance between the B TFT (120b) connected to the B pixel electrode (130b) and the B pixel electrode (130b).

20 Claims, 14 Drawing Sheets

(58) Field of Classification Search
USPC .......................................................... 349/42
See application file for complete search history.

(56) References Cited

U.S. PATENT DOCUMENTS

2009/0072233 A1    3/2009  Hayashi et al.
2011/0187953 A1*   8/2011  Hiyama .................. G02F 1/136
                                                    349/42

* cited by examiner

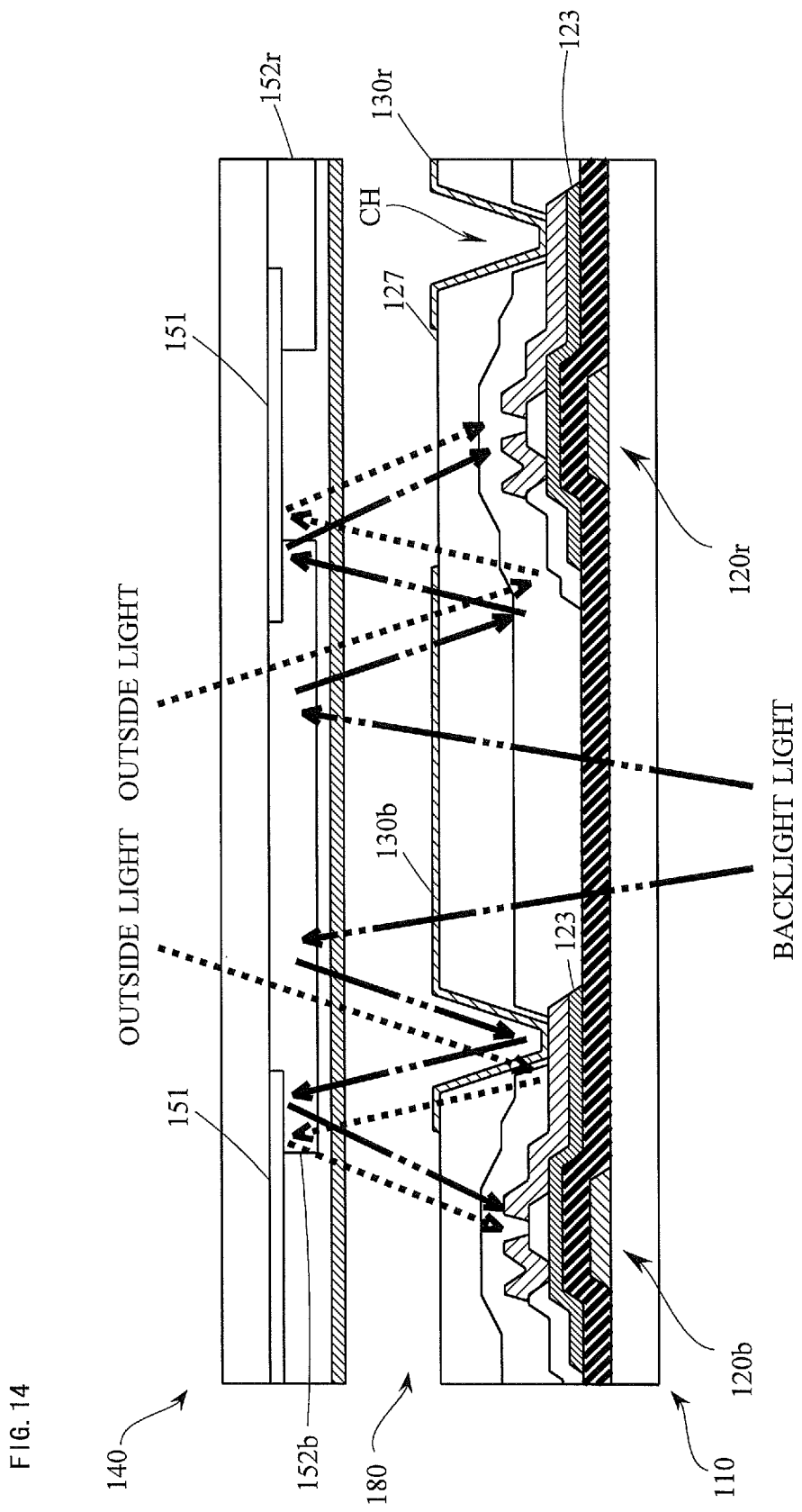

LIQUID CRYSTAL DISPLAY PANEL AND LIQUID CRYSTAL DISPLAY DEVICE INCLUDING SAME

TECHNICAL FIELD

The present invention relates to a liquid crystal display panel and a liquid crystal display device including the liquid crystal display panel, and more particularly to a liquid crystal display panel using TFTs (Thin Film Transistors) which use an oxide semiconductor for their channel layers, and a liquid crystal display device including the liquid crystal display panel.

BACKGROUND ART

In recent years, a TFT that uses an oxide semiconductor for its channel layer has been receiving attention. This thin film made of an oxide semiconductor (hereinafter, also referred to as an "oxide semiconductor film") has high mobility and high visible light transmission properties, and thus, is used for applications of liquid crystal display devices, etc. For the oxide semiconductor film, there is known, for example, an oxide semiconductor film made of $InGaZnO_x$ (hereinafter, referred to as "IGZO") which is an oxide semiconductor using indium (In), gallium (Ga), zinc (Zn), and oxygen (O) as its main components.

Meanwhile, a liquid crystal display panel has a problem that due to entry of light into a channel layer of a TFT, changes in the threshold of the TFT occur. It is known that in a TFT using IGZO for its channel layer (which may be hereinafter referred to as an "IGZO-TFT") in particular, the electrical conductivity level changes on the short wavelength side of visible light due to optical absorption (see, for example, Patent Document 1). Specifically, in a TFT that uses IGZO for its channel layer, changes in threshold occur due to entry of short-wavelength visible light into the channel layer. This causes a reduction in the reliability of the liquid crystal display panel.

In connection with the invention of the present application, Patent Document 2 discloses a liquid crystal display panel in which a red color filter pattern which absorbs short-wavelength light most is disposed in a position on a color filter substrate that faces a TFT on an array substrate. According to such a configuration, since short-wavelength light can be prevented from entering the channel layers of the TFTs, changes in the thresholds of the TFTs can be suppressed.

PRIOR ART DOCUMENTS

Patent Documents

[Patent Document 1] Japanese Patent Application Laid-Open No. 2007-250984
[Patent Document 2] Japanese Patent Application Laid-Open No. 2001-91971

SUMMARY OF THE INVENTION

Problems to be Solved by the Invention

However, in the liquid crystal display panel described in Patent Document 2, red color filter patterns are disposed in positions facing TFTs in blue and green subpixel formation portions. That is, color filters of different colors are provided close to each other. Hence, red light having leaked from the neighborhood of the TFTs is mixed in blue or green display. As a result, red is mixed in the blue or green display, degrading display quality.

An object of the present invention is therefore to provide a liquid crystal display panel that improves the reliability of thin film transistors while suppressing a degradation in display quality, and a liquid crystal display device including the liquid crystal display panel.

Solution to the Problems

A first aspect of the present invention is directed to a liquid crystal display panel for displaying a color image based on a predetermined number of primary colors, the liquid crystal display panel comprising:
a first substrate and a second substrate facing each other;
a liquid crystal layer sandwiched between the first substrate and the second substrate;
a plurality of video signal lines and a plurality of scanning signal lines disposed to intersect each other on the first substrate;
a plurality of pixel formation portions disposed in a matrix form along the plurality of video signal lines and the plurality of scanning signal lines; and
coloring layers of the predetermined number of primary colors, wherein
each pixel formation portion includes a plurality of subpixel formation portions associated with the predetermined number of primary colors, respectively,
each subpixel formation portion includes:
a thin film transistor having a channel layer made of an oxide semiconductor, and disposed for a corresponding video signal line and a corresponding scanning signal line disposed along the subpixel formation portion; and
a pixel electrode connected to the thin film transistor and facing a corresponding coloring layer of a primary color associated with the subpixel formation portion,
in each pixel formation portion, the pixel electrodes of the plurality of subpixel formation portions are arranged in a predetermined direction,
a thin film transistor connected to one of pixel electrodes adjacent in the predetermined direction to a pixel electrode facing a coloring layer of a primary color with a shortest wavelength among the predetermined number of primary colors is disposed on an opposite side of the one of the pixel electrodes from the pixel electrode facing the coloring layer of the primary color with the shortest wavelength,
a distance between a thin film transistor connected to the pixel electrode facing the coloring layer of the primary color with the shortest wavelength and the pixel electrode facing the coloring layer of the primary color with the shortest wavelength is greater than a distance between the thin film transistor connected to the one of the pixel electrodes and the one of the pixel electrodes, and
a distance between a thin film transistor connected to an other one of the pixel electrodes adjacent in the predetermined direction to the pixel electrode facing the coloring layer of the primary color with the shortest wavelength and the pixel electrode facing the coloring layer of the primary color with the shortest wavelength is greater than or equal to a distance between the thin film transistor connected to the pixel electrode facing the coloring layer of the primary color with the shortest wavelength and the pixel electrode facing the coloring layer of the primary color with the shortest wavelength.

In a second aspect of the present invention, based on the first aspect of the invention, the predetermined direction is an extension direction of the plurality of scanning signal lines, and a distance between a thin film transistor connected to an other one of pixel electrodes adjacent in the extension direction of the plurality of scanning signal lines to the pixel electrode facing the coloring layer of the primary color with the shortest wavelength and the pixel electrode facing the coloring layer of the primary color with the shortest wavelength is greater than a distance between a thin film transistor connected to the pixel electrode facing the coloring layer of the primary color with the shortest wavelength and the pixel electrode facing the coloring layer of the primary color with the shortest wavelength.

In a third aspect of the present invention, based on the second aspect of the invention, the thin film transistor connected to the pixel electrode facing the coloring layer of the primary color with the shortest wavelength and the thin film transistor connected to the other one of the pixel electrodes are disposed in positions facing each other with corresponding video signal lines sandwiched therebetween, the corresponding video signal lines being connected to the thin film transistors, respectively.

In a fourth aspect of the present invention, based on the first aspect of the invention, the predetermined direction is an extension direction of the plurality of video signal lines, and a distance between a thin film transistor connected to an other one of pixel electrodes adjacent in the extension direction of the plurality of video signal lines to the pixel electrode facing the coloring layer of the primary color with the shortest wavelength and the pixel electrode facing the coloring layer of the primary color with the shortest wavelength is equal to a distance between a thin film transistor connected to the pixel electrode facing the coloring layer of the primary color with the shortest wavelength and the pixel electrode facing the coloring layer of the primary color with the shortest wavelength.

In a fifth aspect of the present invention, based on the first aspect of the invention, a light-shielding layer is disposed in a position facing each thin film transistor.

In a sixth aspect of the present invention, based on the first aspect of the invention, the coloring layers are disposed on the second substrate.

In a seventh aspect of the present invention, based on the first aspect of the invention, each coloring layer is disposed on a pixel electrode facing the coloring layer.

In a eighth aspect of the present invention, based on the first aspect of the invention, the primary color with the shortest wavelength is blue.

In a ninth aspect of the present invention, based on the eighth aspect of the invention, the color image is displayed based on red, green, and blue.

In a tenth aspect of the present invention, based on the eighth aspect of the invention, the color image is displayed based on red, green, blue, and yellow.

A eleventh aspect of the present invention is directed to a liquid crystal display device comprising a liquid crystal display panel according to any one of the first to tenth aspects of the inventions.

Effects of the Invention

According to the first aspect of the present invention, in a liquid crystal display panel for displaying a color image based on a predetermined number of primary colors, a thin film transistor in a subpixel formation portion associated with a primary color with the shortest wavelength among the plurality of number of primary colors is disposed in a position further away from a coloring layer of the primary color with the shortest wavelength than in the conventional case. Furthermore, of thin film transistors disposed between a pixel electrode facing a coloring layer of a first primary color and a pixel electrode facing a coloring layer of a second primary color which are arranged consecutively in a predetermined direction, a thin film transistor other than the thin film transistor in the subpixel formation portion associated with the primary color with the shortest wavelength is also disposed in a position further away from the coloring layer of the primary color with the shortest wavelength than in the conventional case. As a result, entry of light of the primary color with the shortest wavelength into a thin film transistor in a subpixel formation portion associated with the primary color with the shortest wavelength and into a thin film transistor other than the thin film transistor in the subpixel formation portion associated with the primary color with the shortest wavelength among thin film transistors disposed between a pixel electrode facing a coloring layer of the first primary color and a pixel electrode facing a coloring layer of the second primary color which are arranged consecutively in the predetermined direction is suppressed, reducing threshold shifts in these thin film transistors. Therefore, the reliability of the thin film transistors in the liquid crystal display panel can be improved. Note that since a configuration such as that in the above-described Patent Document 2 in which color filters of different primary colors are provided in positions close to each other is not adopted, a degradation in display quality caused by the mixing of other primary colors in display in a subpixel formation portion is suppressed.

According to the second or third aspect of the present invention, in a liquid crystal display panel in which coloring layers are formed in a stripe pattern in an extension direction of a plurality of scanning signal lines, the same effects as those brought about in the first aspect of the present invention can be brought about.

According to the fourth aspect of the present invention, in a liquid crystal display panel in which coloring layers are formed in a stripe pattern in an extension direction of a plurality of video signal lines, the same effects as those brought about in the first aspect of the present invention can be brought about.

According to the fifth aspect of the present invention, since entry of light into each thin film transistor is suppressed, a threshold shift in the thin film transistor decreases. By this, the reliability of the thin film transistors in the liquid crystal display panel can be further improved.

According to the sixth aspect of the present invention, in a liquid crystal display panel in which coloring layers are disposed on the second substrate side, the same effects as those brought about in the first aspect of the present invention can be brought about.

According to the seventh aspect of the present invention, in a liquid crystal display panel in which coloring layers are disposed on the first substrate side, the same effects as those brought about in the first aspect of the present invention can be brought about.

According to the eighth aspect of the present invention, entry of blue light into a thin film transistor for blue and a thin film transistor other than a thin film transistor in a subpixel formation portion for blue among thin film transistors disposed between a pixel electrode facing a coloring layer of the first primary color and a pixel electrode facing a coloring layer of the second primary color which are arranged consecutively in the predetermined direction is suppressed, reducing threshold shifts in these thin film transistors. Therefore, the reliability of the thin film transistors in the liquid crystal display panel can be improved.

According to the ninth aspect of the present invention, in a liquid crystal display panel for displaying a color image based on three primary colors, red, green, and blue, the same effect as that brought about in the eighth aspect of the present invention can be brought about.

According to the tenth aspect of the present invention, in a liquid crystal display panel for displaying a color image based on four primary colors, red, green, blue, and yellow, the same effect as that brought about in the eighth aspect of the present invention can be brought about.

According to the eleventh aspect of the present invention, in a liquid crystal display device, the same effect (s) as those brought about in any of the first to tenth aspects of the present invention can be brought about.

BRIEF DESCRIPTION OF THE DRAWINGS

FIG. 14 is a cross-sectional view of B-B' line of FIG. 13.

MODES FOR CARRYING OUT THE INVENTION

0. Basic Consideration

Before describing embodiments of the present invention, basic consideration made by the inventor of the present application to solve the above-described problem will be described.

0.1 Experiment

The inventor of the present application has measured the amounts of shift in threshold (hereinafter, referred to as "threshold shifts") for the case in which an IGZO-TFT is subjected to gate bias stress with monochromatic light of red ($\lambda$=640 nm), green ($\lambda$=520 nm), and blue ($\lambda$=460 nm) irradiated onto the IGZO-TFT using a xenon lamp light source, and for the case in which the IGZO-TFT is subjected to gate bias stress without irradiation of light.

Figure 11:
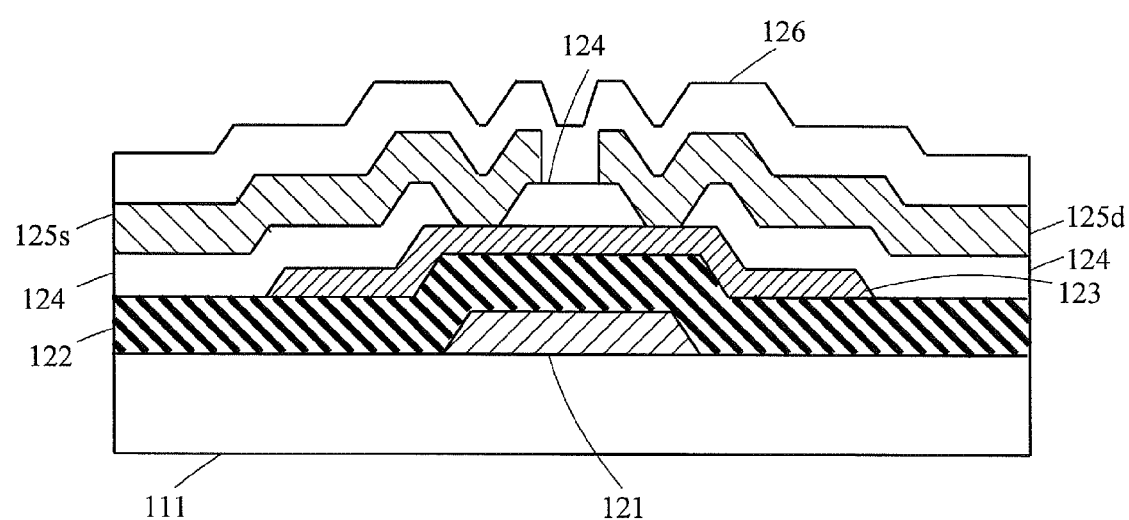
FIG. 11 is a cross-sectional view showing a configuration of a TFT in the basic consideration of the present invention.

FIG. 11 is a cross-sectional view showing a configuration of an IGZO-TFT used in the measurement. As shown in FIG. 11, the IGZO-TFT is a bottom gate-type TFT having an etching stopper structure.

A gate electrode 121 is formed on an insulating substrate 111 made of glass or the like. The gate electrode 121 is a multilayer film in which a titanium (Ti) film, an aluminum (Al) film, and a Ti film are deposited in sequence.

A gate insulting film 122 is deposited on the gate electrode 121 to cover the gate electrode 121. The gate insulating film 122 is a multilayer film in which a silicon nitride ($SiN_x$) film and a silicon dioxide ($SiO_2$) film are deposited in sequence.

A channel layer 123 made of IGZO and having a channel length of 7 to 16 μm and a film thickness of 35 to 55 nm is formed on the gate insulating film 122.

Etching stopper layers 124 made of $SiO_2$ are formed on the left top, right top, and center top of the channel layer 123 in FIG. 11.

A source electrode 125s is formed to cover the left-top etching stopper layer 124 in FIG. 11, a portion of the channel layer 123 whose surface is exposed between the left-top etching stopper layer 124 and the center-top etching stopper layer 124, and a left edge of the center-top etching stopper layer 124. In addition, a drain electrode 125d is formed to cover the right-top etching stopper layer 124, a portion of the channel layer 123 whose surface is exposed between the right-top etching stopper layer 124 and the center-top etching stopper layer 124, and a right edge of the center-top etching stopper layer 124.

A contact hole is formed between the left-top etching stopper layer 124 and the center-top etching stopper layer 124, and the source electrode 125s and the channel layer 123 are connected to each other by the contact hole. Likewise, a contact hole is formed between the right-top etching stopper layer 124 and the center-top etching stopper layer 124, and the drain electrode 125d and the channel layer 123 are connected to each other by the contact hole. Each of the source electrode 125s and the drain electrode 125d is a multilayer film in which a Ti film, an Al film, and a Ti film are deposited in sequence.

An inorganic protective film 126 made of $SiO_2$ is deposited to cover the entire insulating substrate 111 having the source electrode 125s and the drain electrode 125d formed thereon.

Figure 12:
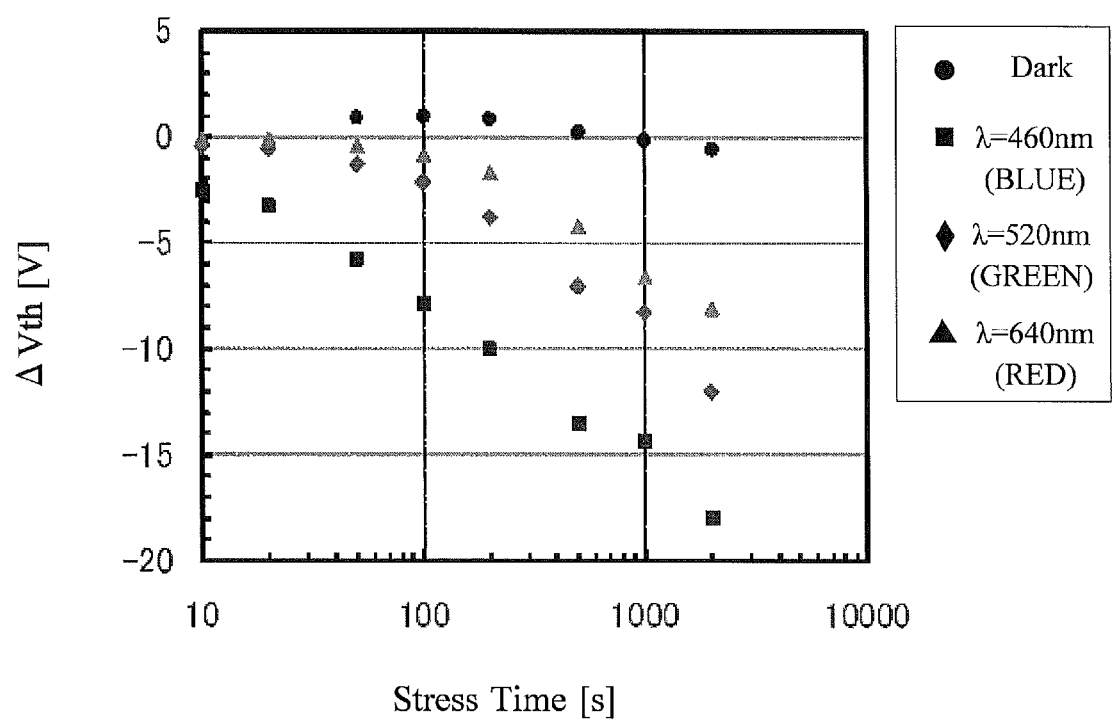
FIG. 12 is a diagram showing experiment results in the basic consideration.

FIG. 12 is a diagram showing threshold shifts $\Delta Vth$ with respect to the time during which gate bias stress is given (hereinafter, referred to as the "stress time"). Here, the experiment temperature is 85° C. and the gate applied voltage is −30 V. As shown in FIG. 12, in the case of no light irradiation (plot for "Dark"), almost no threshold shift occurs even with the passage of the stress time. On the other hand, in the case of irradiation of red monochromatic light (plot for "$\lambda$=640 nm"), in the case of irradiation of green monochromatic light (plot for "$\lambda$=520 nm"), and in the case of irradiation of blue monochromatic light (plot for "$\lambda$=460 nm"), the threshold shift increases with the passage of the stress time. The shorter the wavelength of light irradiated onto the IGZO-TFT, the larger the threshold shift. In particular, in the case of irradiation of blue light having a short wavelength in visible light, the threshold shift is largest.

The cause thereof is considered to be as follows. Specifically, IGZO is generally known as a transparent oxide semiconductor material, but is not completely transparent to visible light. Particularly, blue light with a short wavelength in visible light is easy to be absorbed. By this, a predetermined level is formed in the IGZO. In addition, blue light with a short wavelength is easy to be absorbed at an interface between the gate insulating film 122 and the channel layer (IGZO) 123, too. Hence, a predetermined level is formed at the interface between the gate insulating film 122 and the channel layer (IGZO) 123. As a result, the electrical conductivity of the IGZO increases and thus a threshold shift occurs (the threshold decreases). Note that such a problem is considered to occur not only in IGZO, but also in other oxide semiconductors. Note also that it is considered that the threshold shift for the case of irradiation of yellow monochromatic light is smaller than that for the case of irradiation of green monochromatic light, and is larger than that for the case of irradiation of red monochromatic light.

0.2 Structure of a Conventional Liquid Crystal Display Panel

Figure 13:
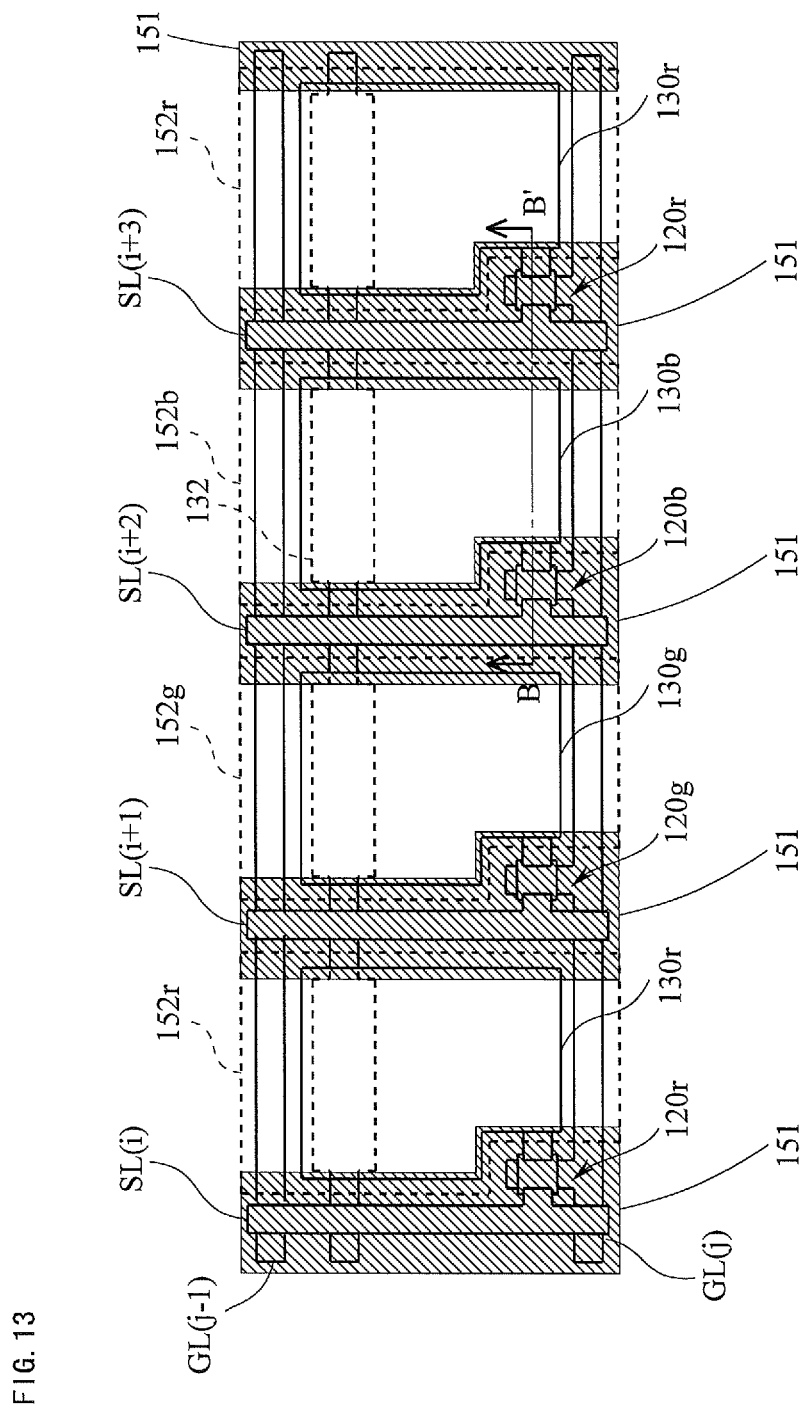
FIG. 13 is a plan view showing a structure of a part of a conventional liquid crystal display panel in the basic consideration.

FIG. 13 is a plan view showing a structure of particularly apart of the TFT substrate side of a conventional liquid crystal display panel. FIG. 14 is a cross-sectional view of B-B' line of FIG. 13. The conventional liquid crystal display panel is configured to display a color image based on three primary colors. As shown in FIG. 14, the liquid crystal display panel is composed of a TFT substrate 110, a counter substrate 140 facing the TFT substrate 110, and a liquid crystal layer 180 sandwiched between the TFT substrate 110 and the counter substrate 140.

As shown in FIG. 13, an R TFT 120r is disposed at an intersection of a source line SL(i) and a gate line GL(j), and an R pixel electrode 130r is connected to a drain electrode of the R TFT 120r. A red color filter 152r (hereinafter, referred to as the "R color filter 152r") is disposed in a position facing the R pixel electrode 130r. Likewise, a G TFT 120g is disposed at an intersection of a source line SL(i+1) and the gate line GL(j), and a G pixel electrode 130g is connected to a drain electrode of the G TFT 120g. A green color filter 152g (hereinafter, referred to as the "G color filter 152g") is disposed in a position facing the G pixel electrode 130g. In addition, likewise, a B TFT 120b is disposed at an intersection of a source line SL(i+2) and the gate line GL(j), and a B pixel electrode 130b is connected to a drain electrode of the B TFT 120b. A blue color filter 152b (hereinafter, referred to as the "B color filter 152b") is disposed in a position facing the B pixel electrode 130b. As shown in FIGS. 13 and 14, a black matrix 151 is formed between the color filters.

In the following, when the R TFT 120r, the G TFT 120g, and the B TFT 120b are not distinguished from one another, they are referred to as the "TFTs 120". Likewise, when the R pixel electrode 130r, the G pixel electrode 130g, and the B pixel electrode 130b are not distinguished from one another, they are referred to as the "pixel electrodes 130".

In such a liquid crystal display panel, outside light and backlight light enter the liquid crystal display panel. The thus entered light passes through a color filter and thereby becomes light of any one of red, green, and blue. As shown in the above-described experiment results, when light enters the channel layer of the TFT, a threshold shift occurs. Particularly, when the entered light is blue, the threshold shift is large.

As shown in FIG. 14, outside light and backlight light having entered the liquid crystal display panel pass through the B color filter 152b. Then, these outside light and backlight light become blue light. The blue light repeats reflection within the liquid crystal display panel, and thereafter enters a channel layer 123 of the B TFT 120b. Hence, a large threshold shift occurs in the B TFT 120b. Note that this blue light may enter not only the channel layer 123 of the B TFT 120b, but also a channel layer 123 of an R TFT 120r connected at its source electrode to a source line SL(i+3). Therefore, there is a possibility that a large threshold shift may also occur in the R TFT 120r.

Even if the configuration described in Patent Document 2 is adopted to suppress such threshold shifts, since, as described above, red color filter patterns are disposed in positions facing TFTs in blue and green subpixel formation portions, light having leaked from the neighborhood of the TFTs is mixed in blue and green display. That is, red is mixed in the blue and green display. Due to this, display quality degrades.

Embodiments of the present invention made by the inventor of the present application based on the above-described basic consideration will be described below with reference to the accompanying drawings.

1. First Embodiment

1.1 Configuration of a Liquid Crystal Display Device

Figure 1:
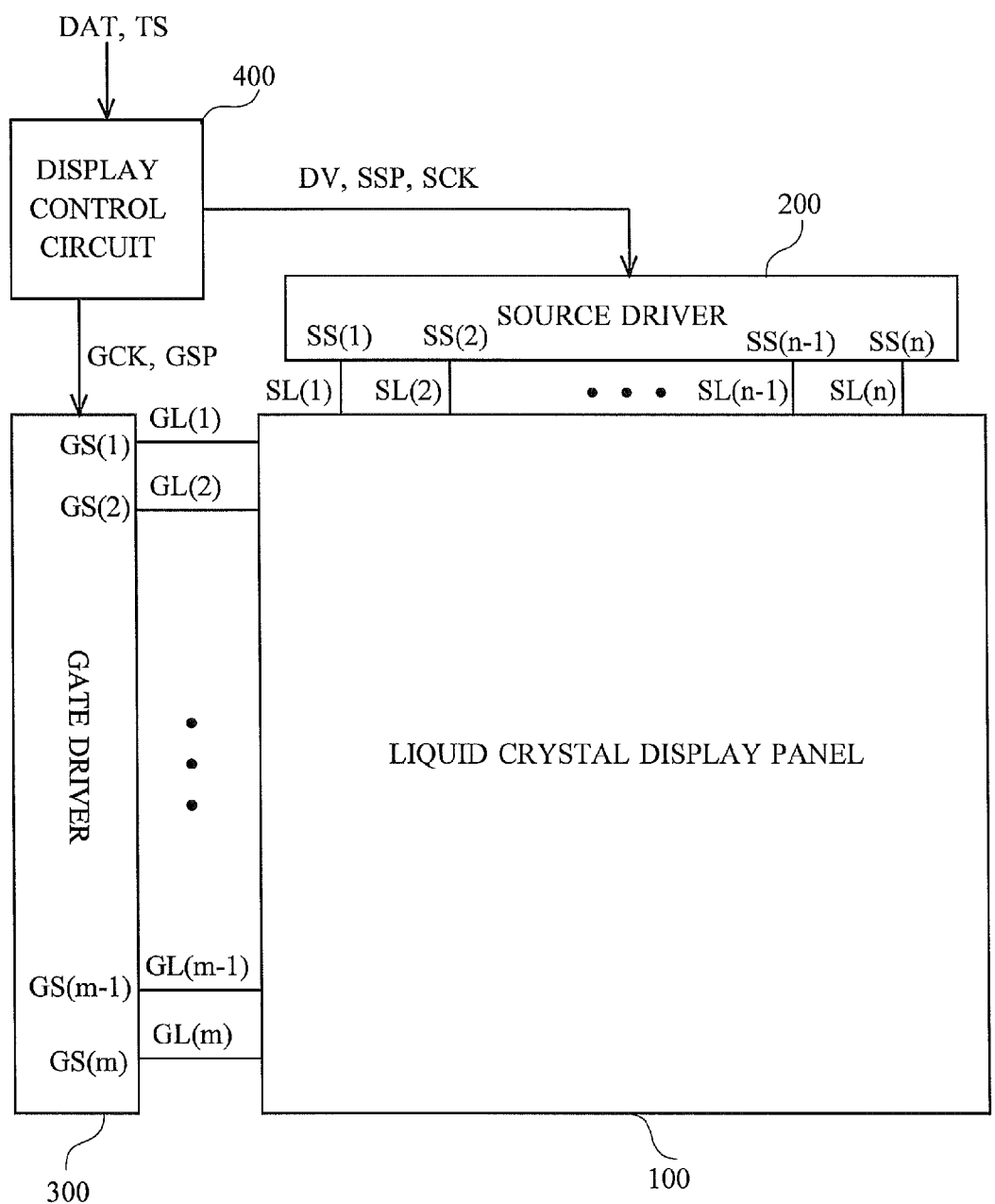
FIG. 1 is a block diagram showing a configuration of a liquid crystal display device including a liquid crystal display panel according to a first embodiment of the present invention.

FIG. 1 is a block diagram showing a configuration of a liquid crystal display device including a liquid crystal display panel 100 according to a first embodiment of the present invention. As shown in FIG. 1, the liquid crystal display device is composed of the liquid crystal display panel 100, a source driver (video signal line drive circuit) 200, a gate driver (scanning signal line drive circuit) 300, a display control circuit 400, and the like. The liquid crystal display panel 100 according to the present embodiment may be of any of a reflective type, a transmissive type, and a semi-transmissive type. In the case of the transmissive type or the semi-transmissive type, a backlight is disposed on the back of the liquid crystal display panel 100.

The liquid crystal display panel 100 is composed of a pair of electrode substrates and a liquid crystal layer sandwiched therebetween. A polarizing plate is affixed onto an outer surface of each electrode substrate. One of the pair of electrode substrates is an active matrix-type substrate called a TFT substrate. The TFT substrate (first substrate) is composed of a plurality of source lines (video signal lines) SL(1) to SL(n) (hereinafter, referred to as the "source lines SL" when they are not distinguished from one another) and a plurality of gate lines (scanning signal lines) GL(1) to GL(m) (hereinafter, referred to as the "gate lines GL" when they are not distinguished from one another) which are disposed in a lattice-like fashion so as to intersect each other on an insulating substrate such as a glass substrate; and TFTs, pixel electrodes, and auxiliary capacitance electrodes which are provided at the respective intersections of the source lines SL and the gate lines GL. The other one of the pair of electrode substrates is called a counter substrate, and is composed of an insulating substrate such as the glass substrate, a common electrode formed on the entire surface of the insulating substrate, and the like. A liquid crystal capacitance is formed by a pixel electrode and the common electrode (described later) facing the pixel electrode. An auxiliary capacitance is formed by the pixel electrode and an auxiliary capacitance electrode. In the following, the liquid crystal capacitance and the auxiliary capacitance may be collectively called a "pixel capacitance". Note that a detailed description of the liquid crystal display panel 100 will be made later.

The display control circuit 400 receives display data DAT and a timing control signal TS from an external source, and outputs an image signal DV, a source start pulse signal SSP, a source clock signal SCK, a gate start pulse signal GSP, a gate clock signal GCK, etc., as signals for allowing the liquid crystal display panel 100 to display an image represented by the display data DAT. The display control circuit 400 is typically implemented as an IC (Integrated Circuit).

The source driver 200 receives the image signal DV, the source start pulse signal SSP, the source clock signal SCK, etc., which are outputted from the display control circuit 400, and applies source signals SS(1) to SS(n) (hereinafter, referred to as the "source signals SS" when they are not distinguished from one another) to the source lines SL(1) to SL(n), respectively. The source driver 200 is typically implemented as an IC.

The gate driver 300 receives the gate start pulse signal GSP, the gate clock signal GCK, etc., which are outputted from the display control circuit 400, and sequentially selects the gate lines GL(1) to GL(m) on a per horizontal scanning period basis during each frame period (each vertical scanning period) for displaying an image on the liquid crystal display panel 100, and applies active gate signals GS(1) to GS(m) (hereinafter, referred to as the "gate signals GS" when they are not distinguished from one another) to the selected gate lines GL(1) to GL(m), respectively. Note that the gate driver 300 may be implemented as an IC, or may be implemented by being formed integrally with the liquid crystal display panel 100.

Note that a common potential Vcom which serves as a reference voltage to be applied to the liquid crystal layer of the liquid crystal display panel 100 is provided to the common electrode (described later) facing the pixel electrodes, by a common electrode drive circuit which is not shown. To the auxiliary capacitance electrodes, the common potential Vcom may be provided from the common electrode drive circuit or a potential may be provided from other drive circuits.

By applying the source signals SS to the respective source lines SL and applying the gate signals GS to the respective gate lines GL in the above-described manner, a voltage according to the pixel value of a pixel to be displayed with reference to the common potential Vcom is provided through a TFT to each pixel electrode of the liquid crystal display panel 100, and is held in a pixel capacitance. By this, a voltage corresponding to a potential difference between each pixel electrode and the common electrode is applied to the liquid crystal layer. As a result, an image based on the display data DAT transmitted from the external source is displayed on the liquid crystal display panel 100.

1.2 Configuration of the Liquid Crystal Display Panel

Figure 2:
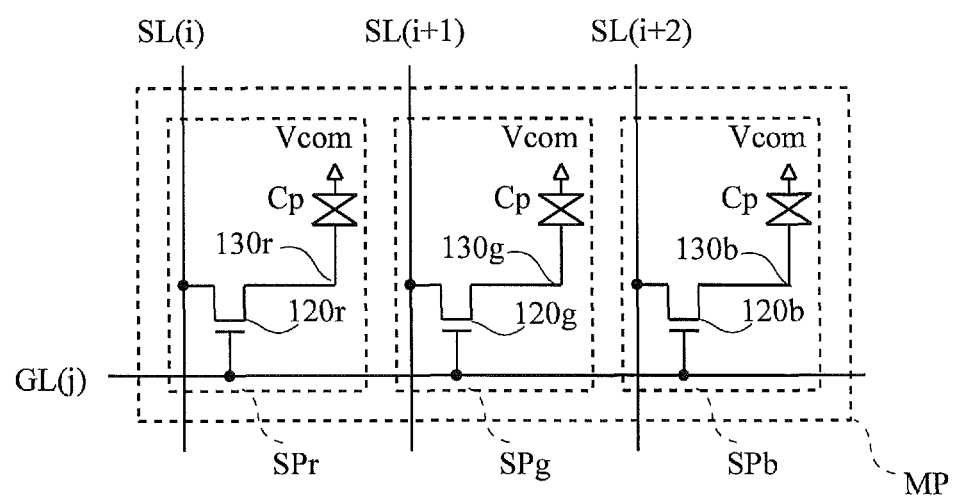
FIG. 2 is a circuit diagram showing an electrical configuration of a pixel formation portion in the first embodiment.

Next, a detailed configuration (electrical configuration and structure) of the liquid crystal display panel 100 according to the present embodiment will be described with reference to FIGS. 2 to 4.

<1.2.1 Electrical Configuration>

First, an electrical configuration of the liquid crystal display panel 100 according to the present embodiment will be described. FIG. 2 is a circuit diagram showing an electrical configuration of a pixel formation portion in the liquid crystal display panel 100 according to the present embodiment. As shown in FIG. 2, the liquid crystal display panel 100 according to the present embodiment is configured to display a color image based on three primary colors (red, green, and blue). Specifically, each pixel formation portion MP is composed of a subpixel formation portion SPr representing a red (R) component (hereinafter, referred to as the "R subpixel formation portion SPr"), a subpixel formation portion SPg representing a green (G) component (hereinafter, referred to as the "G subpixel formation portion SPg"), and a subpixel formation portion SPb representing a blue (B) component (hereinafter, referred to as the "B subpixel formation portion SPb"). Such pixel formation portions MP are disposed in a matrix form along the source lines SL and the gate lines GL. In the following, when the subpixel formation portion R SPr, the G subpixel formation portion SPg, and the B subpixel formation portion SPb are not distinguished from one another, they are referred to as the "subpixel formation portions SP".

The R subpixel formation portion SPr is composed of an R TFT 120*r* connected at its gate terminal to a gate line GL(j) which passes through a corresponding intersection, and connected at its source terminal to a source line SL(i) which passes through the intersection; an R pixel electrode 130*r* connected to a drain terminal of the R TFT 120*r*; and an auxiliary capacitance electrode which is not shown. Note that the auxiliary capacitance electrode is not an essential configuration. As described above, a liquid crystal capacitance is formed by the pixel electrode 130*r* and the common electrode (described later) facing the pixel electrode 130*r*, and an auxiliary capacitance is formed by the pixel electrode 130*r* and the auxiliary capacitance electrode. By the liquid crystal capacitance and the auxiliary capacitance, a pixel capacitance Cp is formed.

Each of the G subpixel formation portion SPg and the B subpixel formation portion SPb has the same configuration as the R subpixel formation portion SPr, except for the R TFT 120*r* and the R pixel electrode 130*r*. Specifically, the G subpixel formation portion SPg has, instead of the R TFT 120*r* and the R pixel electrode 130*r*, a G TFT 120*g* connected at its gate terminal to the gate line GL(j) which passes through a corresponding intersection, and connected at its source terminal to a source line SL(i+1) which passes through the intersection; and a G pixel electrode 130*g* connected to a drain terminal of the G TFT 120*g*. Likewise, the B subpixel formation portion SPb has, instead of the R TFT 120*r* and the R pixel electrode 130*r*, a B TFT 120*b* connected at its gate terminal to the gate line GL(j) which passes through a corresponding intersection, and connected at its source terminal to a source line SL(i+2) which passes through the intersection; and a B pixel electrode 130*b* connected to a drain terminal of the B TFT 120*b*.

<1.2.2 Structure>

Next, a structure of the liquid crystal display panel 100 according to the present embodiment will be described. FIG. 3 is a plan view showing a structure of particularly a part of the TFT substrate side of the liquid crystal display panel 100 according to the present embodiment. FIG. 4 is a cross-sectional view of A-A' line of FIG. 3.

Figure 4:
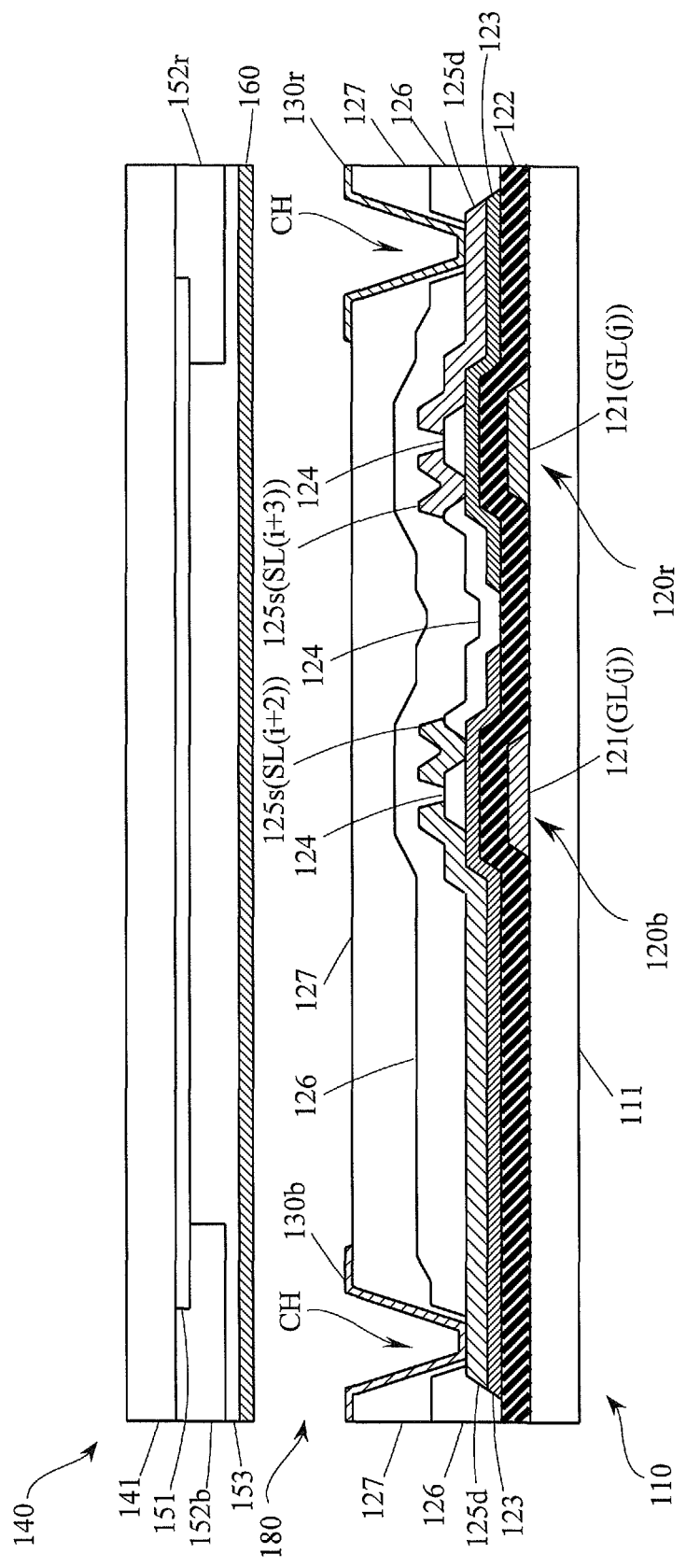
FIG. 4 is a cross-sectional view of A-A' line of FIG. 3.

As shown in FIG. 4, the liquid crystal display panel 100 is composed of a TFT substrate 110, a counter substrate 140 facing the TFT substrate 110, and a liquid crystal layer 180 sandwiched between the TFT substrate 110 and the counter substrate 140. Note that a polarizing plate is affixed onto an outer surface of each of the TFT substrate 110 and the counter substrate 140 (not shown).

The TFT substrate 110 is configured by forming an insulating substrate 111 such as a glass substrate; gate lines GL and source lines SL which are disposed in a lattice-like fashion so as to intersect each other on the insulating substrate 111; TFTs 120 connected at their gate electrodes (gate terminals) 121 to their corresponding gate lines GL, and connected at their source electrodes (source terminals) 125*s* to their corresponding source lines SL; and pixel electrodes 130 connected via contact holes CH to drain electrodes (drain terminals) 125*d* of their corresponding TFTs 120. Note that the gate lines GL and the gate electrodes 121 connected thereto are continuously formed in practice. Likewise, the source lines SL and the source electrodes 125*s* connected thereto are continuously formed in practice.

More specifically, a gate insulting film 122 is formed to cover the entire insulating substrate 111 having the gate lines GL formed thereon. The gate lines GL and the source lines SL intersect each other with the gate insulating film 122, etc., therebetween. In addition, an inorganic protective film 126 and an organic protective film 127 are stacked on top of each other in sequence to cover the entire insulating substrate 111 having the gate liens GL, the source lines SL, and the TFTs 120 formed thereon. The contact holes CH are formed in part of the inorganic protective film 126 and the organic protective film 127. The pixel electrodes 130 are formed on the organic protective film 127 so as to be connected to the drain electrodes 125*d* of their corresponding TFTs 120 via the contact holes CH. Note that the organic protective film 127 is to form the pixel electrodes 130 flatly and is not an essential configuration.

Figure 3:
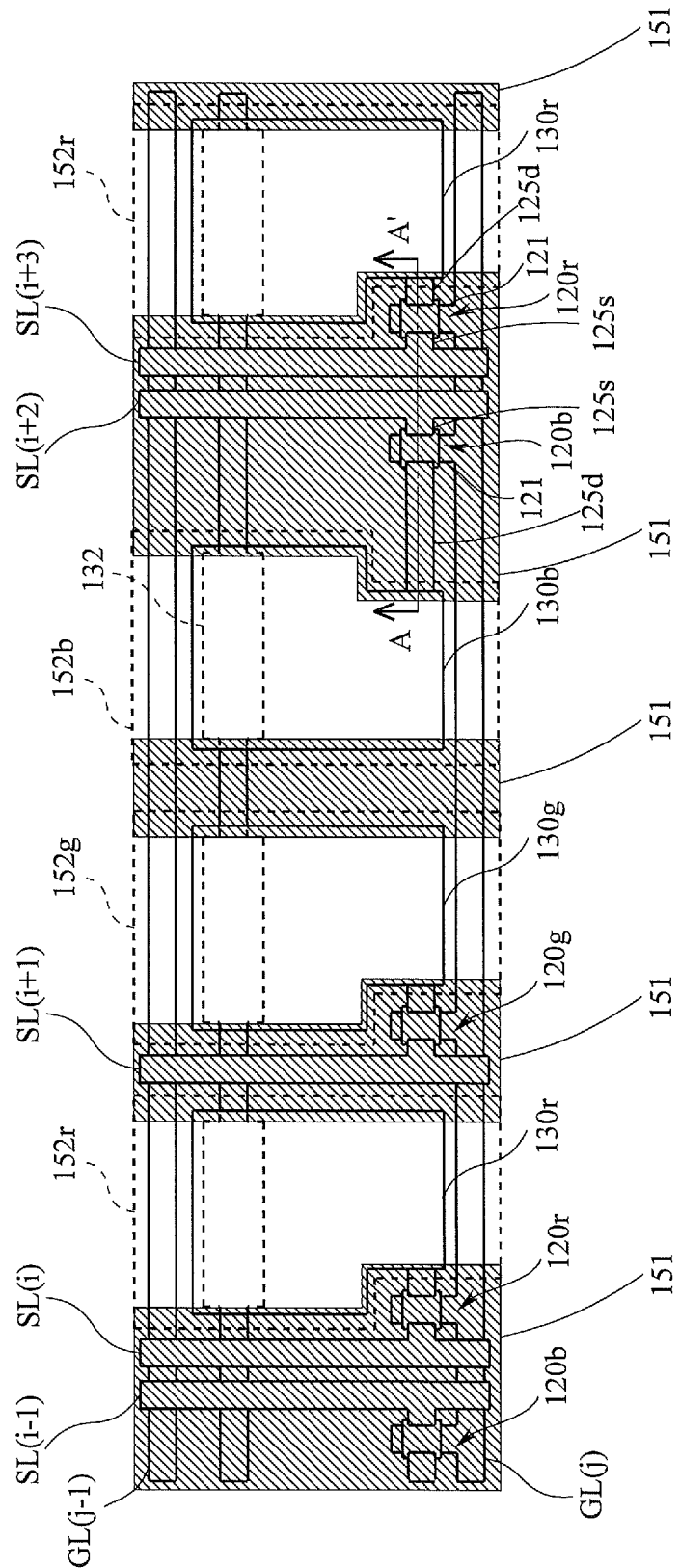
FIG. 3 is a plan view showing a structure of a part of the liquid crystal display panel according to the first embodiment.

As shown in FIG. 3, an R pixel electrode 130*r*, a G pixel electrode 130*g*, and a B pixel electrode 130*b* are arranged in sequence from the front of an extension direction of the gate lines GL (hereinafter, referred to as the "gate line extension direction"). Here, the front of the gate line extension direction refers to the side of the gate lines GL connected to the gate driver 300. The opposite side of the front of the gate line extension direction is referred to as the rear of the gate line extension direction.

In an extension direction of the source lines SL (hereinafter, referred to as the "source line extension direction"), pixel electrodes 130 for the same primary color are arranged (not shown). In the following, the side of the source lines SL connected to the source driver 200 is referred to as the front of the source line extension direction, and the opposite side of the front is referred to as the rear of the source line extension direction.

Although in the present embodiment, as described above, the R pixel electrode 130*r*, the G pixel electrode 130*g*, and the B pixel electrode 130*b* are arranged in sequence from the front of the gate line extension direction, the order of arrangement of the pixel electrodes 130 is not limited thereto. For example, the R pixel electrode 130*r*, the B pixel electrode 130*b*, and the G pixel electrode 130*g* may be arranged in this order from the front of the gate line extension direction.

In addition, in the present embodiment and embodiments which will be described later, an auxiliary capacitance electrode 132 is formed in a position on the insulating substrate 111 facing a part of each pixel electrode 130. Note that the formation position of the auxiliary capacitance electrode 132 is not limited to the mode of the present embodiment and the embodiments which will be described later. Note also that the auxiliary capacitance electrodes 132 may not be formed in the above-described manner.

The counter substrate 140 is composed of an insulating substrate 141 such as a glass substrate; a black matrix 151 formed on the insulating substrate 141 and serving as a light-shielding layer; R color filters 152*r* serving as red coloring layers, G color filters 152*g* serving as green coloring layers, and B color filters 152*b* serving as blue coloring layers (hereinafter, referred to as the "color filters 152" when they are not distinguished from one another); a protective film 153 formed to cover the black matrix 151 and the color filters 152; and a common electrode 160 formed on the protective film 153. The color filters 152 are formed in a stripe pattern in the source line extension direction. In the present specification, the color filters thus formed in a stripe pattern in the source line extension direction are referred to as the "color filters in a vertical stripe pattern".

To sufficiently suppress leakage of outside light and backlight light, it is desirable that, as shown in FIG. 4, a part of the black matrix 151 and a part of the color filters 152 overlap each other. Note that the protective film 153 is to form the common electrode 160 flatly and is not an essential component.

As shown in FIGS. 3 and 4, the R pixel electrode 130*r* and the R color filter 152*r* face each other. Likewise, the G pixel electrode 130*g* and the G color filter 152*g* face each other, and the B pixel electrode 130*b* and the B color filter 152*b* face each other. To suppress leakage of outside light and backlight light, it is desirable that the edges of each pixel electrode 130 face the black matrix 151.

Now, a configuration of the TFTs 120 will be described using an R TFT 120*r* as an example. As shown in FIG. 4, the R TFT 120*r* is a bottom gate-type TFT having an etching stopper structure. The R TFT 120*r* is formed on the insulating substrate 111, and is configured by stacking a gate electrode 121 (gate line GL(j)), a gate insulating film 122, a channel layer 123 made of IGZO, an etching stopper layer 124, a source electrode 125*s* (source line SL(i+3))/a drain electrode 125*d*, and an inorganic protective film 126 on top of one another in sequence from the side of the insulating substrate 111. Note that the materials of the layers, the films, and the electrodes other than the channel layer 123 are not particularly limited. Note also that the layers, the films, and the electrodes are not particularly limited, either. The G TFT 120*g* and the B TFT 120*b* have the same configuration as the R TFT 120*r*, and thus, description thereof is omitted.

Next, the disposition of the TFTs 120 in the present embodiment will be described. As shown in FIG. 3, in the present embodiment, the G TFT 120*g* connected at its drain electrode 125*d* to the G pixel electrode 130*g* (one of the pixel electrodes) which is adjacent frontward in the gate line extension direction to a B pixel electrode 130*b* is disposed on the opposite side of the G pixel electrode 130*g* from the B pixel electrode 130*b*. The distance between the B TFT 120*b* connected at its drain electrode 125*d* to the B pixel electrode 130*b* and the B pixel electrode 130*b* is greater than the distance between the G TFT 120*g* connected at its drain electrode 125*d* to the G pixel electrode 130*g* (one of the pixel electrodes) and the G pixel electrode 130*g*. The distance between the R TFT 120*r* connected at its drain electrode 125*d* to the R pixel electrode 130*r* (the other pixel electrode) which is adjacent rearward in the gate line extension direction to the B pixel electrode 130*b* and the B pixel electrode 130*b* is greater than the distance between the B TFT 120*b* connected to the B pixel electrode 130*b* and the B pixel electrode 130*b*.

In addition, as shown in FIG. 3, a source line SL(i+2) having the source electrode 125s of the B TFT 120b connected thereto and a source line SL(i+3) having the source electrode 125s of the R TFT 120r connected thereto are adjacent to each other in the gate line extension direction. That is, the B TFT 120b connected at its drain electrode 125d to the B pixel electrode 130b and the R TFT 120r connected at its drain electrode 125d to the R pixel electrode 130r (the other pixel electrode) which is adjacent rearward in the gate line extension direction to the B pixel electrode 130b are disposed in positions facing each other with the source lines SL(i+2) and SL(i+3) having the source electrodes 125s of the B TFT 120b and the R TFT 120r connected thereto, respectively, sandwiched therebetween.

Furthermore, as shown in FIG. 3, the R TFT 120r connected at its source electrode 125s to a source line SL(i) or the source line SL(i+3) and the G TFT 120g connected at its source electrode 125s to a source line SL(i+1) are disposed near (in cutout portions of) the R pixel electrode 130r and the G pixel electrode 130g, respectively, as in the conventional case. On the other hand, the B TFT 120b connected at its source electrode 125s to the source line SL(i+2) is disposed in a position further away from the B pixel electrode 130b than in the conventional case, and closer to the R pixel electrode 130r than in the conventional case.

As such, in the present embodiment, a B TFT 120b in a B subpixel formation portion SPb is disposed in a position further away from a B pixel electrode 130b connected to a drain electrode 125d of the B TFT 120b and from a B color filter 152b facing the B pixel electrode 130b than in the conventional case. At the same time, an R TFT 120r in an R subpixel formation portion SPr adjacent to the B subpixel formation portion SPb is disposed in a position further away from the B pixel electrode 130b in the B subpixel formation portion SPb and from the B color filter 152b facing the B pixel electrode 130b than in the conventional case. Note that the distance between the B pixel electrode 130b in the B subpixel formation portion SPb and the B color filter 152b facing the B pixel electrode 130b, and a G TFT 120g in a G subpixel formation portion SPg is the same as that in the conventional case.

As shown in FIGS. 3 and 4, the black matrix 151 is disposed between the color filters 152. That is, the black matrix 151 is disposed on each TFT 120. By this, entry of light into each TFT 120 can be suppressed, reducing a threshold shift in each TFT 120. In the present embodiment, in accordance with the above-described disposition of the TFTs 120, the width (the length in the gate line extension direction) of a portion of the black matrix 151 between the B color filter 152b and the R color filter 152r is set to be larger than each of the width of a portion of the black matrix 151 between the R color filter 152r and the G color filter 152g and the width of a portion of the black matrix 151 between the G color filter 152g and the B color filter 152b. In addition, to make the aperture ratios of the subpixel formation portions SP uniform, the widths of the color filters 152 are set to be uniform.

As described above, in the present embodiment, the color filters in a vertical stripe pattern 152 are formed. Each color filter 152 is formed continuously in the source line extension direction. That is, as shown in FIG. 3, color filters 152 are disposed also in positions facing gate lines GL(j-1) and GL(j) which are located at the front and rear of each pixel electrode 130, respectively, in the source line extension direction. However, the present invention is not limited thereto, and each color filter 152 may be formed discontinuously in the source line extension direction. Specifically, instead of the color filters 152, the black matrix 151 may be disposed in a position facing the gate lines GL(j-1) and GL(j) which are located at the front and rear of each pixel electrode 130, respectively, in the source line extension direction.

1.3 Effects

According to the present embodiment, in a liquid crystal display panel which displays a color image based on three primary colors, red, green, and blue, and in which color filters in a vertical stripe pattern are formed, a B TFT 120b in a B subpixel formation portion SPb is disposed in a position further away from a B color filter 152b than in the conventional case. Furthermore, an R TFT 120r disposed between a B pixel electrode 130b and an R pixel electrode 130r which are arranged consecutively in the gate line extension direction is also disposed in a position further away from the B color filter 152b than in the conventional case. As a result, entry of blue light into the B TFT 120b and the R TFT 120r is suppressed, reducing threshold shifts in these TFTs. Therefore, the reliability of the TFTs in the liquid crystal display panel can be improved.

Note that in the present embodiment since the position of the B TFT 120b is closer to the positions of the R TFT 120r and the R color filter 152r facing the R TFT 120r than in the conventional case, the amount of red light entering the B TFT 120b increases over the conventional case, but it does not hinder the above-described reduction in threshold shift. Specifically, in the B TFT 120b, while the amount of entered red light increases, the amount of entered blue light with a shorter wavelength than red light decreases. As a result, as described above, a threshold shift in the B TFT 120b decreases over the conventional case.

In addition, in the present embodiment, since a configuration such as that in the above-described Patent Document 2 in which color filters of different primary colors are provided in positions close to each other is not adopted, a degradation in display quality caused by the mixing of other primary colors in display in a subpixel formation portion (e.g., the mixing of red in display in a subpixel formation portion SPb) is suppressed.

1.4 Variant

Figure 5:
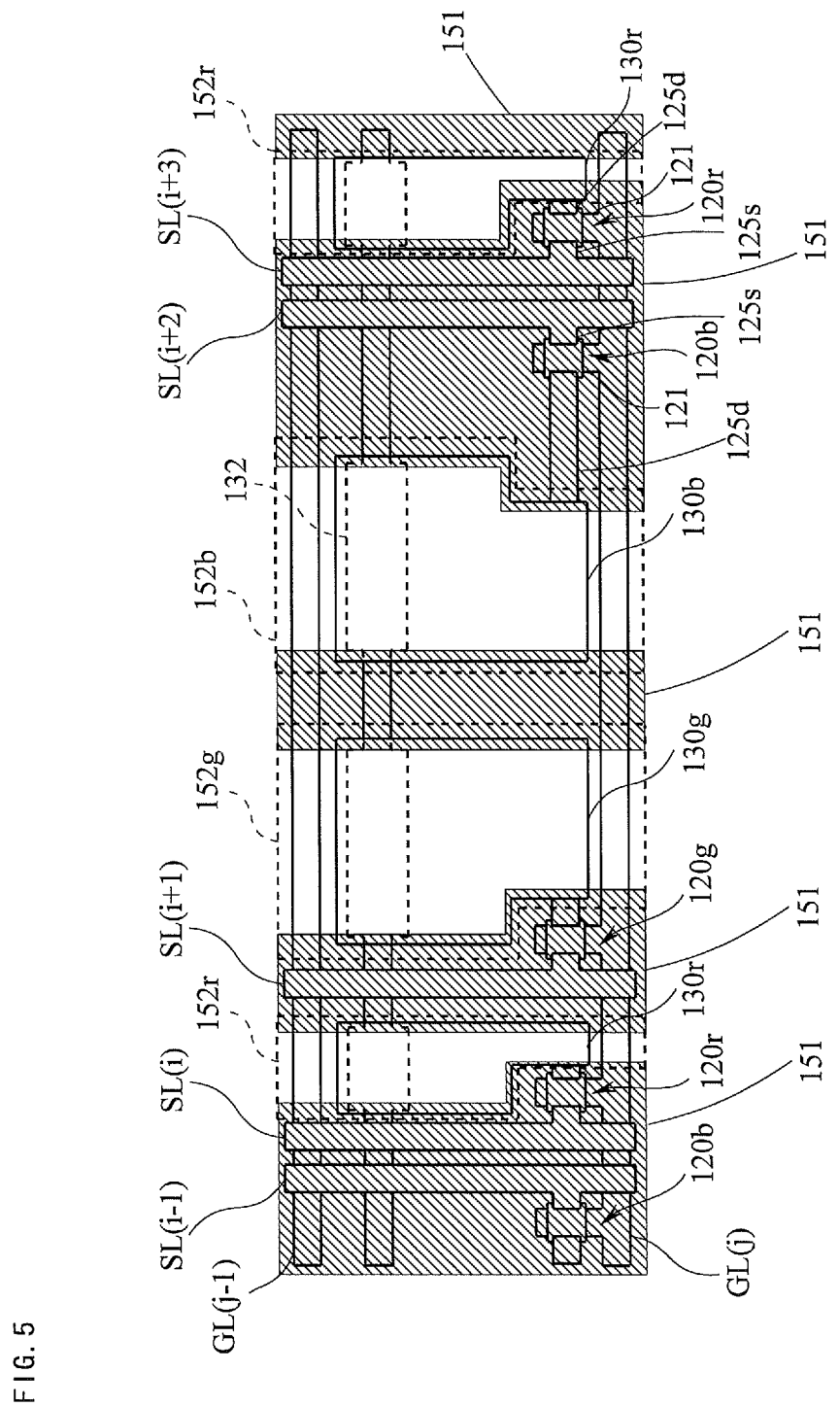
FIG. 5 is a plan view showing a structure of a part of a liquid crystal display panel according to a variant of the first embodiment.

FIG. 5 is a plan view showing a structure of particularly a part of the TFT substrate side of a liquid crystal display panel 100 according to a variant of the first embodiment of the present invention. As shown in FIG. 5, in the present variant, the widths (the lengths in the gate line extension direction) of an R pixel electrode 130r and an R color filter 152r are reduced over the first embodiment. Note that other components are the same as those of the first embodiment.

The widths of an R pixel electrode 130r located at the rear of a B pixel electrode 130b in the gate line extension direction and an R color filter 152r facing the R pixel electrode 130r are set to be smaller than the widths of pixel electrodes 130 for other primary colors and color filters 152 facing the pixel electrodes 130. In other words, the width of the R pixel electrode 130r and the width of the R color filter 152r are reduced by an amount corresponding to an increase in the width of a portion of a black matrix 151 between a B color filter 152b and the R color filter 152r over each of the width of a portion of the black matrix 151 between the R color filter 152r and a G color filter 152g and the width of a portion of the black matrix 151 between the G color filter 152g and the B color filter 152b. By this, the reliability of the liquid crystal display panel 100 can be improved without increasing the size of the liquid crystal display panel 100 over the conventional case.

In the present variant, it is desirable to change the voltage of a source signal SS to be applied to a source line SL which is connected to the R pixel electrode 130*r* through the R TFT 120*r* (to increase the voltage in the case of normally black or to reduce the voltage in the case of normally white), for an amount corresponding to a reduction in the width of the R pixel electrode 130*r* and the width of the R color filter 152*r*.

Note that instead of the widths of the R pixel electrode 130*r* and the R color filter 152*r*, the widths of the G pixel electrode 130*g* and the G color filter 152*g* may be reduced. Likewise, instead of the widths of the R pixel electrode 130*r* and the R color filter 152*r*, the widths of the B pixel electrode 130*b* and the B color filter 152*b* may be reduced.

2. Second Embodiment

2.1 Structure of a Liquid Crystal Display Panel

Figure 6:
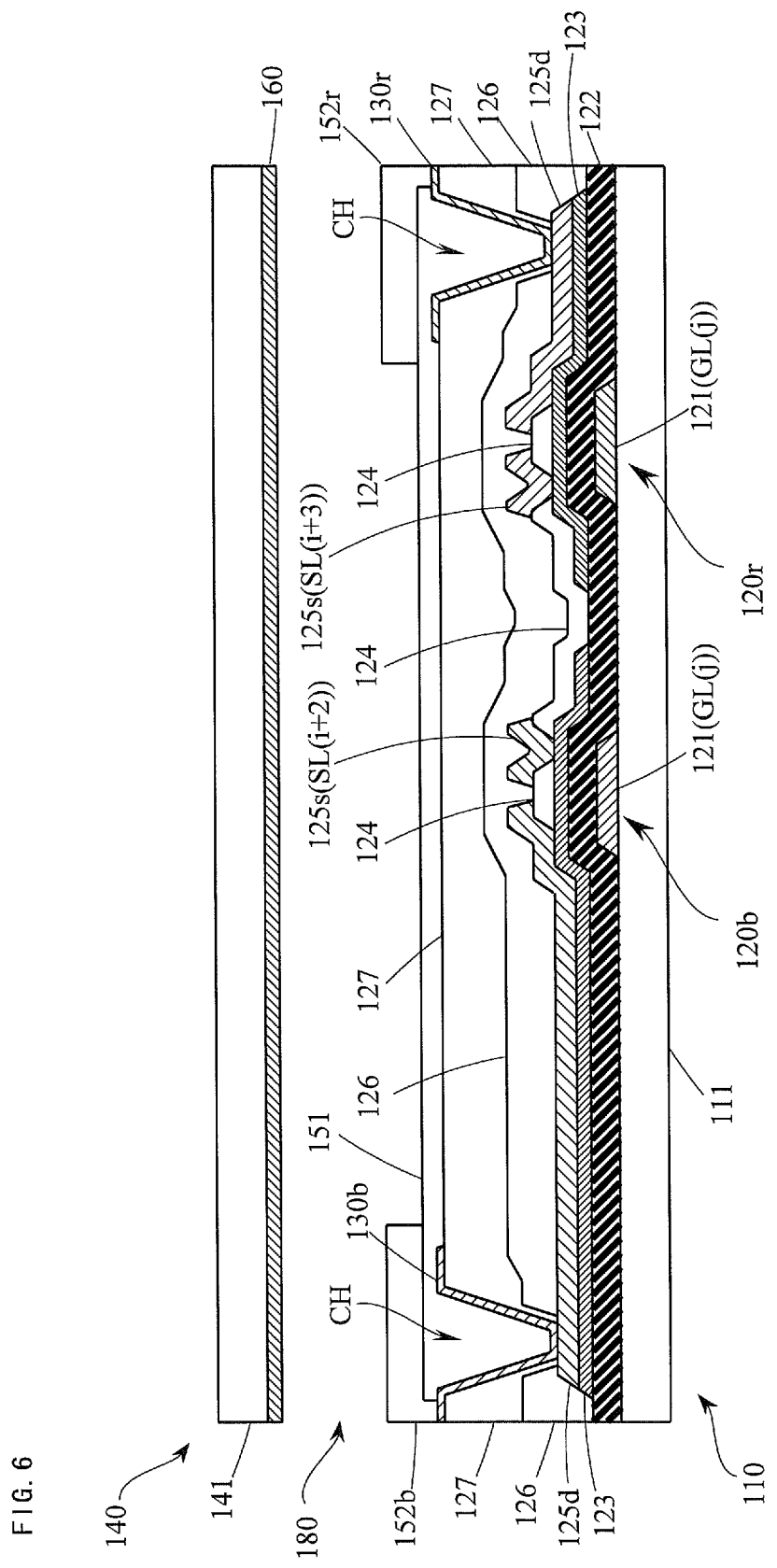
FIG. 6 is a cross-sectional view showing a structure of a part of a liquid crystal display panel according to a second embodiment of the present invention.

A structure of a liquid crystal display panel 100 according to a second embodiment of the present invention will be described with reference to FIG. 6. Note that, out of the components of the present embodiment, the same components as those in the first embodiment are denoted by the same reference characters and description thereof is omitted. FIG. 6 is a cross-sectional view (corresponding to a cross-sectional view of A-A' line of FIG. 3) showing a structure of a part of the liquid crystal display panel 100 according to the second embodiment of the present invention.

In a liquid crystal display panel 100 according to the first embodiment, a black matrix 151 and color filters 152 are disposed on a counter substrate 140. On the other hand, in the liquid crystal display panel 100 according to the present embodiment, as shown in FIG. 6, those black matrix 151 and color filters 152 are disposed on the side of a TFT substrate 110.

The black matrix 151 is formed to cover an organic protective film 127 and part of pixel electrodes 130 (portions corresponding to contact holes CH). For example, the black matrix 151 is formed to cover the organic protective film 127 and each of a portion of a B pixel electrode 130*b* corresponding to a contact hole CH and a portion of an R pixel electrode 130*r* corresponding to a contact hole CH.

In addition, each color filter 152 is formed to cover a pixel electrode 130 facing thereto and a part of the black matrix 151. For example, a B color filter 152*b* is formed to cover a B pixel electrode 130*b* and a part of the black matrix 151 that covers a portion of the B pixel electrode 130*b* corresponding to a contact hole CH (an upper portion of the contact hole CH). In addition, for example, an R color filter 152*r* is formed to cover an R pixel electrode 130*r* and a part of the black matrix 151 that covers a portion of the R pixel electrode 130*r* corresponding to a contact hole CH (an upper portion of the contact hole CH).

A counter substrate 140 is configured such that a common electrode 160 is directly formed on an insulating substrate 141.

Note that the disposition of TFTs 120 in the present embodiment is the same as that of the above-described first embodiment (the same as the disposition shown in FIG. 3). A G TFT 120*g* connected at its drain electrode 125*d* to a G pixel electrode 130*g* (one of the pixel electrodes) which is adjacent frontward in the gate line extension direction to a B pixel electrode 130*b* is disposed on the opposite side of the G pixel electrode 130*g* from the B pixel electrode 130*b*. The distance between a B TFT 120*b* connected at its drain electrode 125*d* to the B pixel electrode 130*b* and the B pixel electrode 130*b* is greater than the distance between the G TFT 120*g* connected at its drain electrode 125*d* to the G pixel electrode 130*g* (one of the pixel electrodes) and the G pixel electrode 130*g*. The distance between an R TFT 120*r* connected at its drain electrode 125*d* to an R pixel electrode 130*r* (the other pixel electrode) which is adjacent rearward in the gate line extension direction to the B pixel electrode 130*b* and the B pixel electrode 130*b* is greater than the distance between the B TFT 120*b* connected to the B pixel electrode 130*b* and the B pixel electrode 130*b*.

In addition, a source line SL(i+2) having a source electrode 125*s* of the B TFT 120*b* connected thereto and a source line SL(i+3) having a source electrode 125*s* of the R TFT 120*r* connected thereto are adjacent to each other in the gate line extension direction. That is, the B TFT 120*b* connected at its drain electrode 125*d* to the B pixel electrode 130*b* and the R TFT 120*r* connected at its drain electrode 125*d* to the R pixel electrode 130*r* (the other pixel electrode) which is adjacent rearward in the gate line extension direction to the B pixel electrode 130*b* are disposed in positions facing each other with the source lines SL(i+2) and SL(i+3) having the source electrodes 125*s* of the B TFT 120*b* and the R TFT 120*r* connected thereto, respectively, sandwiched therebetween.

Furthermore, the R TFT 120*r* connected at its source electrode 125*s* to a source line SL(i) or the source line SL(i+3) and the G TFT 120*g* connected at its source electrode 125*s* to a source line SL(i+1) are disposed near (in cutout portions of) the R pixel electrode 130*r* and the G pixel electrode 130*g*, respectively, as in the conventional case. On the other hand, the B TFT 120*b* connected at its source electrode 125*s* to the source line SL(i+2) is disposed in a position further away from the B pixel electrode 130*b* than in the conventional case, and closer to the R pixel electrode 130*r* than in the conventional case.

2.2 Effects

According to the present embodiment, in the liquid crystal display panel 100 in which the black matrix 151 and the color filters 152 are disposed on the side of the TFT substrate 110, as in the first embodiment, entry of blue light into the B TFTs 120*b* and the R TFTs 120*r* is suppressed. Therefore, the same effects as those brought about in the first embodiment can be brought about.

3. Third Embodiment

3.1 Configuration of a Liquid Crystal Display Panel

Figure 7:
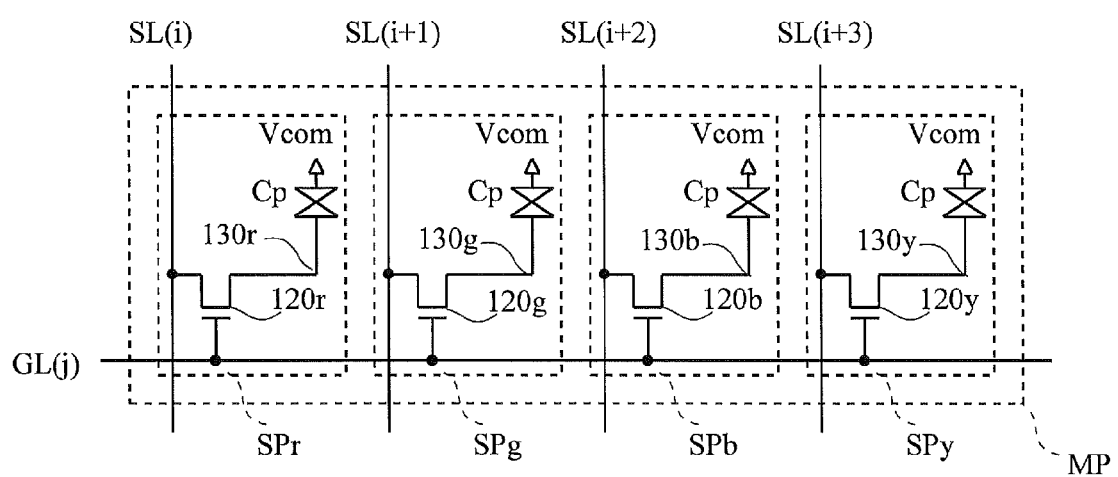
FIG. 7 is a circuit diagram showing an electrical configuration of a pixel formation portion in a third embodiment of the present invention.

A configuration (electrical configuration and structure) of a liquid crystal display panel 100 according to a third embodiment of the present invention will be described with reference to FIGS. 7 and 8. Note that, out of the components of the present embodiment, the same components as those in the first embodiment are denoted by the same reference characters and description thereof is omitted.

<3.1.1 Electrical Configuration>

First, an electrical configuration of the liquid crystal display panel 100 according to the present embodiment will be described. FIG. 7 is a circuit diagram showing an electrical configuration of a pixel formation portion in the liquid crystal display panel 100 according to the present embodiment. A liquid crystal display panel 100 according to the first embodiment is configured to display a color image based on three primary colors (red, green, and blue). On the other hand, the liquid crystal display panel 100 according to the present embodiment is configured, as shown in FIG. 7, to display a color image based on four primary colors (red, green, blue, and yellow). Specifically, each pixel formation portion MP is composed of a subpixel formation portion SPy representing yellow (Y) (hereinafter, referred to as the "Y subpixel formation portion SPy"), in addition to an R subpixel formation portion SPr, a G subpixel formation portion SPg, and a B subpixel formation portion SPb. In the following, when the R subpixel formation portion SPr, the G subpixel formation portion SPg, and the B subpixel formation portion SPb, and further the Y subpixel formation portion SPy are not distinguished from one another, they are referred to as the "subpixel formation portions SP".

The Y subpixel formation portion SPy has the same configuration as the R subpixel formation portion SPr, the G subpixel formation portion SPg, and the B subpixel formation portion SPb. Specifically, the Y subpixel formation portion SPy is composed of a Y TFT 120y connected at its gate terminal to a gate line GL(j) which passes through a corresponding intersection, and connected at its source terminal to a source line SL(i+3) which passes through the intersection; a Y pixel electrode 130y connected to a drain terminal of the Y TFT 120y; and an auxiliary capacitance electrode which is not shown. The configuration of the Y TFT 120y is the same as that of an R TFT 120r, a G TFT 120g, and a B TFT 120b.

In the following, when the R TFT 120r, the G TFT 120g, and the B TFT 120b, and further the Y TFT 120y are not distinguished from one another, they are referred to as the "TFTs 120". Likewise, when an R pixel electrode 130r, a G pixel electrode 130g, and a B pixel electrode 130b, and further the Y pixel electrode 130y are not distinguished from one another, they are referred to as the "pixel electrodes 130".

<3.1.2 Structure>

Next, a structure of the liquid crystal display panel 100 according to the present embodiment will be described. FIG. 8 is a plan view showing a structure of particularly a part of the TFT substrate side of the liquid crystal display panel 100 according to the third embodiment of the present invention.

Figure 8:
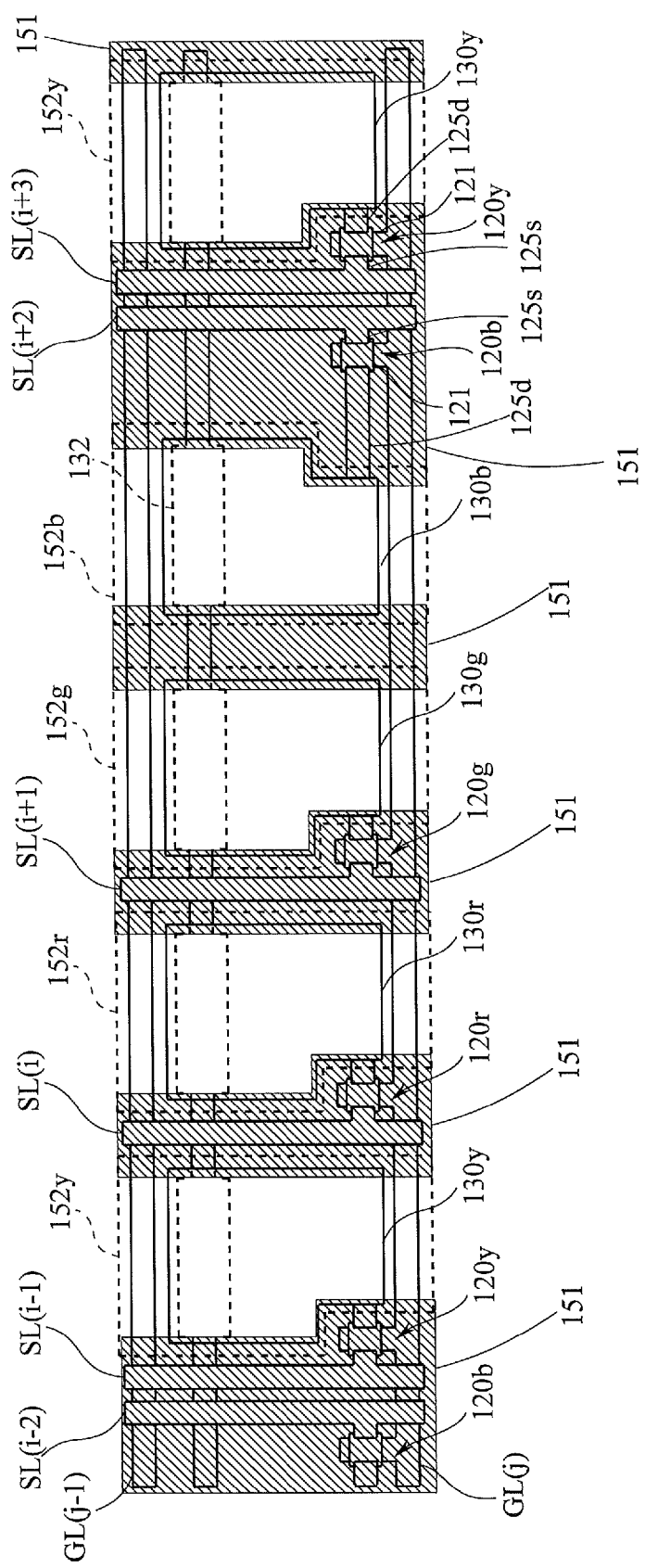
FIG. 8 is a plan view showing a structure of a part of a liquid crystal display panel according to the third embodiment.

As shown in FIG. 8, in the present embodiment, an R pixel electrode 130r, a G pixel electrode 130g, a B pixel electrode 130b, and a Y pixel electrode 130y are arranged in sequence from the front of the gate line extension direction. Note that the order of arrangement of the pixel electrodes 130 is not limited thereto. For example, the R pixel electrode 130r, the Y pixel electrode 130y, the B pixel electrode 130b, and the G pixel electrode 130g may be arranged in this order from the front of the gate line extension direction.

A yellow color filter 152y (hereinafter, referred to as the "Y color filter 152y") serving as a yellow coloring layer is formed in a position facing the Y pixel electrode 130y. In the following, when an R color filter 152r, a G color filter 152g, and a B color filter 152b, and further the Y color filter 152y are not distinguished from one another, they are referred to as the "color filters 152". The color filters 152 and a black matrix 151 may be disposed on the side of a counter substrate 140 as in the first embodiment, or may be disposed on the side of a TFT substrate 110 as in the second embodiment.

Next, the disposition of the TFTs 120 in the present embodiment will be described. As shown in FIG. 8, in the present embodiment, a G TFT 120g connected at its drain electrode 125d to a G pixel electrode 130g (one of the pixel electrodes) which is adjacent frontward in the gate line extension direction to a B pixel electrode 130b is disposed on the opposite side of the G pixel electrode 130g from the B pixel electrode 130b. The distance between a B TFT 120b connected at its drain electrode 125d to the B pixel electrode 130b and the B pixel electrode 130b is greater than the distance between the G TFT 120g connected at its drain electrode 125d to the G pixel electrode 130g (one of the pixel electrodes) and the G pixel electrode 130g. The distance between a Y TFT 120y connected at its drain electrode 125d to a Y pixel electrode 130y (the other pixel electrode) which is adjacent rearward in the gate line extension direction to the B pixel electrode 130b and the B pixel electrode 130b is greater than the distance between the B TFT 120b connected to the B pixel electrode 130b and the B pixel electrode 130b.

In addition, as shown in FIG. 8, a source line SL(i+2) having a source electrode 125s of the B TFT 120b connected thereto and a source line SL(i+3) having a source electrode 125s of the Y TFT 120y connected thereto are adjacent to each other in the gate line extension direction. That is, the B TFT 120b connected at its drain electrode 125d to the B pixel electrode 130b and the Y TFT 120y connected at its drain electrode 125d to the Y pixel electrode 130y (the other pixel electrode) which is adjacent rearward in the gate line extension direction to the B pixel electrode 130b are disposed in positions facing each other with the source lines SL(i+2) and SL(i+3) having the source electrodes 125s of the B TFT 120b and the Y TFT 120y connected thereto, respectively, sandwiched therebetween.

Furthermore, as shown in FIG. 8, the Y TFT 120y connected at its source electrode 125s to a source line SL(i−1) or the source line SL(i+3), the R TFT 120r connected at its source electrode 125s to a source line SL(i), and the G TFT 120g connected at its source electrode 125s to a source line SL(i+1) are disposed near (in cutout portions of) the Y pixel electrode 130y, the R pixel electrode 130r, and the G pixel electrode 130g, respectively, as in the conventional case. On the other hand, the B TFT 120b connected at its source electrode 125s to the source line SL(i+2) is disposed in a position further away from the B pixel electrode 130b than in the conventional case, and closer to the Y pixel electrode 130y than in the conventional case.

As such, in the present embodiment, as in the above-described first embodiment, a B TFT 120b in a B subpixel formation portion SPb is disposed in a position further away from a B pixel electrode 130b connected to a drain electrode 125d of the B TFT 120b and from a B color filter 152b facing the B pixel electrode 130b than in the conventional case. At the same time, a Y TFT 120y in a Y subpixel formation portion SPy adjacent to the B subpixel formation portion SPb is disposed in a position further away from the B pixel electrode 130b in the B subpixel formation portion SPb and from the B color filter 152b facing the B pixel electrode 130b than in the conventional case. Note that the distance between the B pixel electrode 130b in the B subpixel formation portion SPb and the B color filter 152b facing the B pixel electrode 130b, and a G TFT 120g in a G subpixel formation portion SPg is the same as that in the conventional case.

As shown in FIG. 8, the black matrix 151 is disposed between the color filters 152. That is, the black matrix 151 is disposed on each TFT 120. In the present embodiment, in accordance with the above-described disposition of the TFTs 120, the width of a portion of the black matrix 151 between the B color filter 152b and the Y color filter 152y is set to be larger than each of the width of a portion of the black matrix 151 between the Y color filter 152y and the R color filter 152r, the width of a portion of the black matrix 151 between the R color filter 152r and the G color filter 152g, and the width of a portion of the black matrix 151 between the G color filter 152g and the B color filter 152b. In addition, to make the aperture ratios of the subpixel formation portions SP uniform, the widths of the color filters 152 are set to be uniform.

Note that as in the variant of the above-described first embodiment, taking into account the size of the liquid crystal display panel 100, the widths of the Y pixel electrode 130y and the Y color filter 152y may be made smaller than the widths of pixel electrodes 130 for other primary colors and color filters 152 facing the pixel electrodes 130. Alternatively, instead of the widths of the Y pixel electrode 130y and the Y color filter 152y, the widths of pixel electrodes 130 for other primary colors and color filters 152 facing the pixel electrodes 130 may be made smaller. In this case, it is desirable to change the voltage of a source signal SS to be applied to a source line SL which is connected to a pixel electrode 130 through a TFT 120 (to increase the voltage in the case of normally black or to reduce the voltage in the case of normally white), for an amount corresponding to a reduction in the widths of the pixel electrode 130 and a color filter 152 facing the pixel electrode 130.

3.2 Effects

According to the present embodiment, in a liquid crystal display panel for displaying a color image based on four primary colors, red, green, blue, and yellow, the same effects as those brought about in the first embodiment can be brought about.

4. Fourth Embodiment

4.1 Structure of a Liquid Crystal Display Panel

Figure 9:
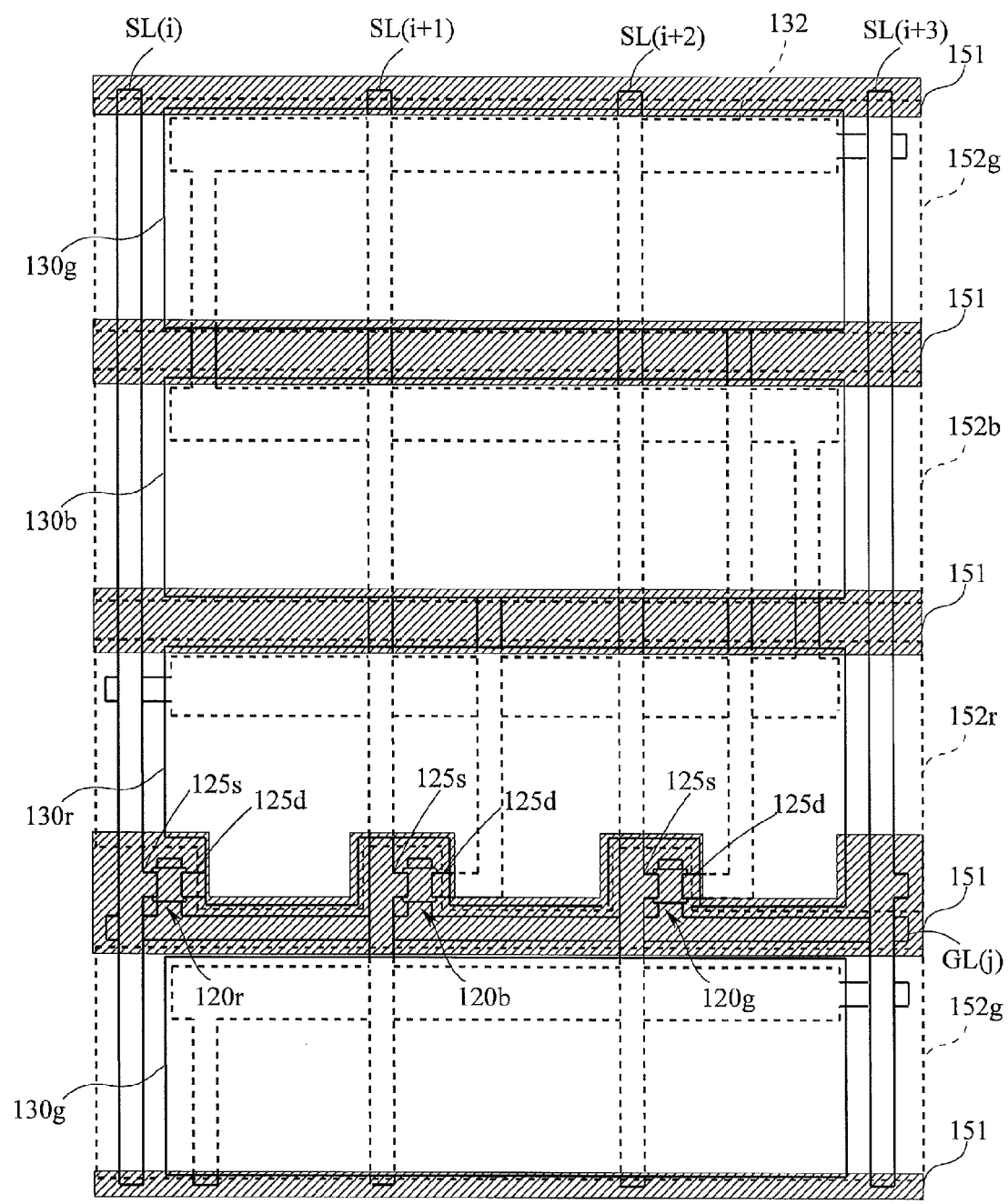
FIG. 9 is a plan view showing a structure of a part of a liquid crystal display panel according to a fourth embodiment of the present invention.

A structure of a liquid crystal display panel 100 according to a fourth embodiment of the present invention will be described with reference to FIG. 9. Note that, out of the components of the present embodiment, the same components as those in the first embodiment are denoted by the same reference characters and description thereof is omitted. FIG. 9 is a plan view showing a structure of particularly a part of the TFT substrate side of the liquid crystal display panel 100 according to the present embodiment.

As in the above-described first embodiment, the liquid crystal display panel 100 according to the present embodiment is configured to display a color image based on three primary colors (red, green, and blue). However, the direction in which pixel electrodes 130 are arranged in the present embodiment is different from that in the first embodiment. Specifically, in the first embodiment, pixel electrodes 130 for the respective primary colors are arranged in sequence from the front of the gate line extension direction. On the other hand, in the present embodiment, pixel electrodes 130 for the respective primary colors are arranged in sequence from the front of the source line extension direction.

As shown in FIG. 9, a G pixel electrode 130g, a B pixel electrode 130b, and an R pixel electrode 130r are arranged in sequence from the front of the source line extension direction, but the order of arrangement of the pixel electrodes 130 is not limited thereto. For example, the R pixel electrode 130r, the B pixel electrode 130b, and the G pixel electrode 130g may be arranged in this order from the front of the source line extension direction. The G pixel electrode 130g and a G color filter 152g face each other. Likewise, the B pixel electrode 130b and a B color filter 152b face each other, and the R pixel electrode 130r and an R color filter 152r face each other. The color filters 152 are formed in a stripe pattern in the gate line extension direction. In the present specification, the color filters thus formed in a stripe pattern in the gate line extension direction are referred to as the "color filters in a horizontal stripe pattern".

The color filters 152 and a black matrix 151 may be disposed on the side of a counter substrate 140 as in the first embodiment, or may be disposed on the side of a TFT substrate 110 as in the second embodiment.

Note that the electrical configuration of the liquid crystal display panel 100 according to the present embodiment is the same as that of a liquid crystal display panel 100 according to the first embodiment, and thus, description thereof is omitted.

Next, the disposition of TFTs 120 in the present embodiment will be described. As shown in FIG. 9, in the present embodiment, an R TFT 120r connected at its drain electrode 125d to the R pixel electrode 130r (one of the pixel electrodes) which is adjacent rearward in the source line extension direction to the B pixel electrode 130b is disposed on the opposite side of the R pixel electrode 130r from the B pixel electrode 130b. The distance between a B TFT 120b connected at its drain electrode 125d to the B pixel electrode 130b and the B pixel electrode 130b is greater than the distance between the R TFT 120r connected at its drain electrode 125d to the R pixel electrode 130r (one of the pixel electrodes) and the R pixel electrode 130r. The distance between a G TFT 120g connected at its drain electrode 125d to the G pixel electrode 130g (the other pixel electrode) which is adjacent frontward in the source line extension direction to the B pixel electrode 130b and the B pixel electrode 130b is equal to the distance between the B TFT 120b connected to the B pixel electrode 130b and the B pixel electrode 130b.

In addition, as shown in FIG. 9, between the R pixel electrode 130r and a G pixel electrode 130g adjacent to each other in the source line extension direction, there are disposed the R TFT 120r, the B TFT 120b, and the G TFT 120g connected at their drain electrodes 125d to the R pixel electrode 130r, the B pixel electrode 130b, and the G pixel electrode 130g, respectively. That is, between the R pixel electrode 130r and the G pixel electrode 130g there are disposed three TFTs 120 including the B TFT 120b. Note that in the gate line extension direction there are arranged pixel electrodes 130 for the same primary color (not shown).

Beneath each of the R pixel electrode 130r connected to a source line SL(i) through the R TFT 120r, the B pixel electrode 130b located at the front of the R pixel electrode 130r in the source line extension direction, and the G pixel electrode 130g located at the front of the B pixel electrode 130b in the source line extension direction, there are disposed a source line SL(i+1) and a source line SL(i+2) with an organic protective film 127 and an inorganic protective film 126 sandwiched therebetween. Likewise, beneath the G pixel electrode 130g, too, which is located at the rear of the R pixel electrode 130r connected to the source line SL(i) through the R TFT 120r in the source line extension direction, there are disposed the source line SL(i+1) and the source line SL(i+2) with the organic protective film 127 and the inorganic protective film 126 sandwiched therebetween.

As shown in FIG. 9, the G pixel electrode 130g and the B pixel electrode 130b are formed in a rectangular shape. That is, the G pixel electrode 130g and the B pixel electrode 130b are not provided with cutout portions for disposing TFTs 120 nearby. On the other hand, the R pixel electrode 130*r* is provided with cutout portions for disposing three TFTs nearby. The R TFT 120*r*, the B TFT 120*b*, and the G TFT 120*g* connected at their source electrodes 125*s* to the source lines SL(i), SL(i+1), and SL(i+2), respectively, are disposed in the cutout portions.

As such, in the present embodiment, an R TFT 120*r*, a B TFT 120*b*, and a G TFT 120*g* are disposed in positions away from a B pixel electrode 130*b* and from a B color filter 152*b* facing the B pixel electrode 130*b*, by a distance corresponding to the width (the length in the source line extension direction) of an R pixel electrode 130*r* in an R subpixel formation portion SPr adjacent to a B subpixel formation portion SPb.

As shown in FIG. 9, the black matrix 151 is disposed between the color filters 152. That is, the black matrix 151 is disposed on each TFT 120. In the present embodiment, in accordance with the above-described disposition of the TFTs 120, the width (the length in the source line extension direction) of a portion of the black matrix 151 between the R color filter 152*r* and the G color filter 152*g* that faces each TFT 120 is set to be larger compared to those of other portions. In addition, to make the aperture ratios of the subpixel formation portions SP uniform, the width (the length in the source line extension direction) of the R pixel electrode is set to be larger than those of other pixel electrodes so as to increase the area of the R pixel electrode 130*r* by an amount corresponding to the area of the cutout portions. In accordance with this, the width (the length in the source line extension direction) of the R color filter 152 is also set to be larger than those of color filters of other colors.

As described above, in the present embodiment, the color filters in a horizontal stripe pattern 152 are formed. Each color filter 152 is formed continuously in the gate line extension direction. That is, color filters 152 are disposed also in positions facing the source lines SL(i) and SL(i+3) which are located at the front and rear of each pixel electrode 130, respectively, in the gate line extension direction. However, the present invention is not limited thereto, and each color filter 152 may be formed discontinuously in the gate line extension direction. Specifically, instead of the color filters 152, the black matrix 151 may be disposed in a position facing the source lines SL(i) and SL(i+3) which are located at the front and rear of each pixel electrode 130, respectively, in the gate line extension direction.

4.2 Effects

According to the present embodiment, in a liquid crystal display panel which displays a color image based on three primary colors, red, green, and blue, and in which color filters in a horizontal stripe pattern are formed, as in the first embodiment, entry of blue light into the B TFTs 120*b* and the R TFTs 120*r* is suppressed. Therefore, the same effects as those brought about in the first embodiment can be brought about.

Note that although in the present embodiment the positions of TFTs 120 for the respective primary colors are close to the positions of an R TFT 120*r* and an R color filter 152*r* facing the R TFT 120*r* and the positions of a G TFT 120*g* and a G color filter 152*g* facing the G TFT 120*g*, it does not hinder the above-described reduction in threshold shift. Specifically, in the TFTs 120 for the respective primary colors, while the amount of entered red light or green light increases, the amount of entered blue light with a shorter wavelength than those lights decreases, resulting in a reduction in a threshold shift in the B TFT 120*b*.

Note that in the present embodiment even when a configuration is adopted that displays a color image based on four primary colors, red, green, blue, and yellow, like the above-described third embodiment, the same effects can be brought about. In this case, the configuration needs to be such that a B pixel electrode 130*b* and a color filter 152*b* facing the B pixel electrode 130*b* are not located at both the front and rear of the positions of TFTs 120 for the respective primary colors in the source line extension direction.

4.3 Variant

Figure 10:
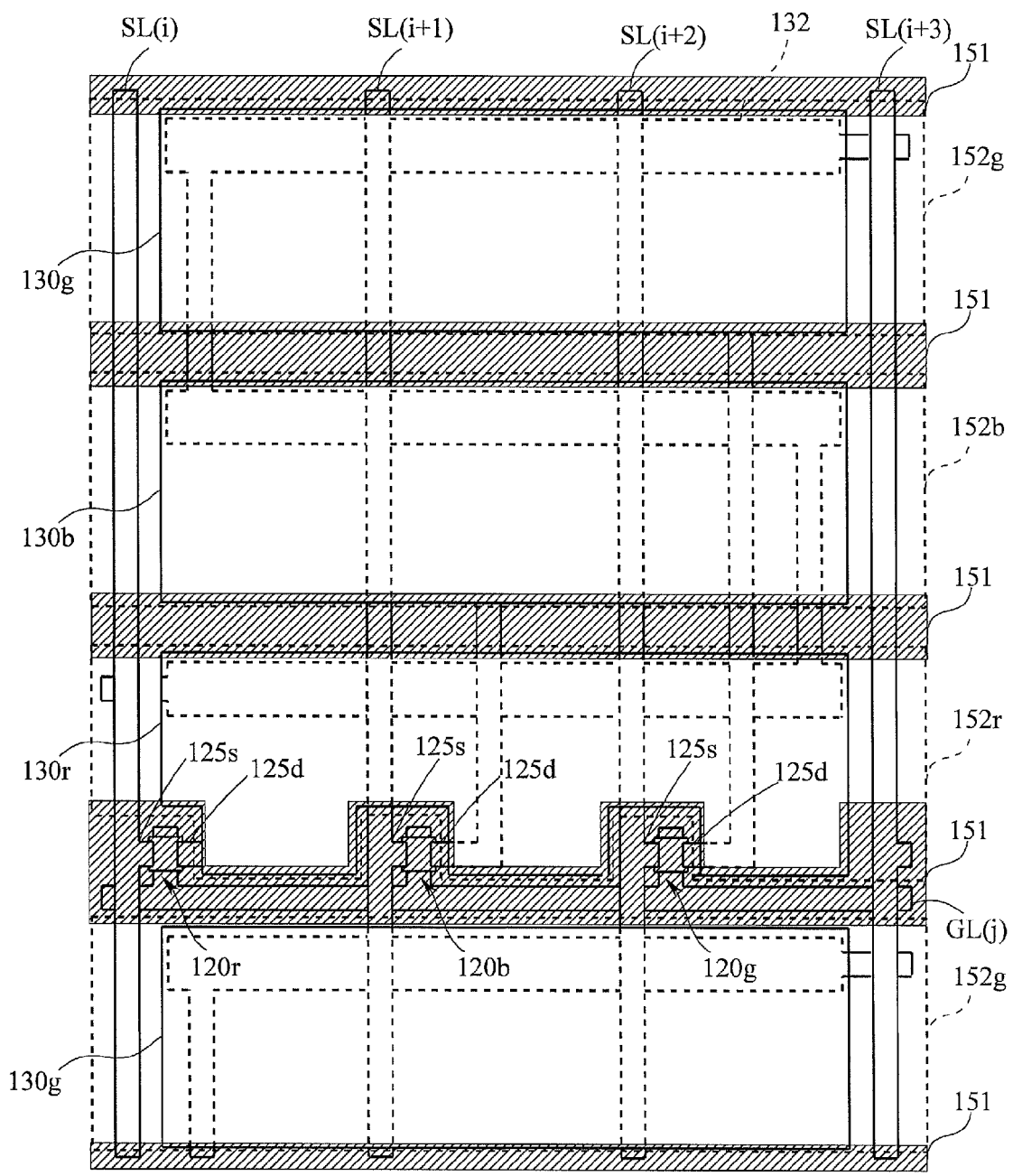
FIG. 10 is a plan view showing a structure of a part of a liquid crystal display panel according to a variant of the fourth embodiment.

FIG. 10 is a plan view showing a structure of particularly a part of the TFT substrate side of a liquid crystal display panel 100 according to a variant of the fourth embodiment of the present invention. As shown in FIG. 10, the present variant is such that in the fourth embodiment the widths (in the source line extension direction) of an R pixel electrode 130*r* and an R color filter 152*r* are reduced. Note that other components are the same as those in the fourth embodiment.

The widths of an R pixel electrode 130*r* located at the rear of a B pixel electrode 130*b* in the source line extension direction and an R color filter 152*r* facing the R pixel electrode 130*r* are set to be smaller than the widths of pixel electrodes 130 for other primary colors and color filters 152 facing the pixel electrodes 130. In other words, the width of the R pixel electrode 130*r* and the width of the R color filter 152*r* are set to be smaller by an amount corresponding to an increase in the width of a portion of a black matrix 151 between the B color filter 152*b* and the R color filter 152*r* over each of the width of a portion of the black matrix 151 between the R color filter 152*r* and the G color filter 152*g* and the width of a portion of the black matrix 151 between the G color filter 152*g* and the B color filter 152*b*. By this, the reliability of the liquid crystal display panel 100 can be improved without increasing the size of the liquid crystal display panel 100 over the conventional case.

In the present variant, it is desirable to change the voltage of a source signal SS to be applied to a source line SL which is connected to the R pixel electrode 130*r* through the R TFT 120*r* (to increase the voltage in the case of normally black or to reduce the voltage in the case of normally white), for an amount corresponding to a reduction in the width of the R pixel electrode 130*r* and the width of the R color filter 152*r*.

Note that instead of the widths of the R pixel electrode 130*r* and the R color filter 152*r*, the widths of the G pixel electrode 130*g* and the G color filter 152*g* may be reduced. Likewise, instead of the widths of the R pixel electrode 130*r* and the R color filter 152*r*, the widths of the B pixel electrode 130*b* and the B color filter 152*b* may be reduced.

5. Others

Although in the above-described embodiments a pixel electrode 130 is provided with a cutout portion to dispose a TFT 120, the present invention is not limited thereto. Such a cutout portion may not be provided.

Although in the above-described embodiments three (or four) source lines SL and one gate line GL are provided for one pixel formation portion MP, the present invention is not limited thereto. For example, the present invention can also be applied to a mode in which one source line SL and three (or four) gate lines GL are provided for one pixel formation portion MP.

In addition to the above, the above-described embodiments may be modified and implemented in various ways without departing from the spirit and scope of the present invention.

By the above, according to the present invention, a liquid crystal display panel that improves the reliability of thin film transistors while suppressing a degradation in display quality, and a liquid crystal display device including the liquid crystal display panel can be provided.

INDUSTRIAL APPLICABILITY

The present invention can be applied to a liquid crystal display panel that uses TFTs having channel layers made of an oxide semiconductor.

DESCRIPTION OF REFERENCE CHARACTERS

100: LIQUID CRYSTAL DISPLAY PANEL
110: TFT SUBSTRATE (FIRST SUBSTRATE)
120r: R TFT (THIN FILM TRANSISTOR)
120g: G TFT (THIN FILM TRANSISTOR)
120b: B TFT (THIN FILM TRANSISTOR)
120y: Y TFT (THIN FILM TRANSISTOR)
121: GATE ELECTRODE (GATE TERMINAL)
125d: DRAIN ELECTRODE (DRAIN TERMINAL)
125s: SOURCE ELECTRODE (SOURCE TERMINAL)
130r: R PIXEL ELECTRODE
130g: G PIXEL ELECTRODE
130b: B PIXEL ELECTRODE
130y: Y PIXEL ELECTRODE
140: COUNTER SUBSTRATE (SECOND SUBSTRATE)
151: BLACK MATRIX (LIGHT-SHIELDING LAYER)
152r: R COLOR FILTER (COLORING LAYER)
152g: G COLOR FILTER (COLORING LAYER)
152b: B COLOR FILTER (COLORING LAYER)
152y: Y COLOR FILTER (COLORING LAYER)
160: COMMON ELECTRODE
180: LIQUID CRYSTAL LAYER
GL(1) to GL(m): GATE LINE (SCANNING SIGNAL LINE)
SL(1) to SL(n): SOURCE LINE (VIDEO SIGNAL LINE)
MP: PIXEL FORMATION PORTION
SPr: R SUBPIXEL FORMATION PORTION
SPg: G SUBPIXEL FORMATION PORTION
SPb: B SUBPIXEL FORMATION PORTION
SPy: Y SUBPIXEL FORMATION PORTION

The invention claimed is:

1. A liquid crystal display panel for displaying a color image based on a predetermined number of primary colors, the liquid crystal display panel comprising:
a first substrate and a second substrate facing each other;
a liquid crystal layer sandwiched between the first substrate and the second substrate;
a plurality of video signal lines and a plurality of scanning signal lines disposed to intersect each other on the first substrate;
a plurality of pixels disposed in a matrix form along the plurality of video signal lines and the plurality of scanning signal lines; and
coloring layers of the predetermined number of primary colors, wherein
each of the pixels includes a plurality of subpixels associated with the predetermined number of primary colors, respectively,
each of the subpixels includes:
a thin film transistor including a source electrode electrically connected to a corresponding one of the plurality of video signal lines disposed along the subpixel, a gate electrode electrically connected to a corresponding one of the plurality of scanning signal lines disposed along the subpixel, a gate insulating film provided on the gate electrode, and a channel layer made of an oxide semiconductor and provided on the gate insulating film; and
a pixel electrode connected to the thin film transistor and facing a corresponding coloring layer of a primary color associated with the subpixel,
in each of the pixels, the pixel electrodes of the plurality of subpixels are arranged in a predetermined direction,
the channel layer includes a channel region corresponding to a region where the channel layer is overlapped with the gate electrode,
one of the thin film transistors connected to one of pixel electrodes adjacent in the predetermined direction to a pixel electrode facing a coloring layer of a primary color with a shortest wavelength among the predetermined number of primary colors is disposed on an opposite side of the one of the pixel electrodes from the pixel electrode facing the coloring layer of the primary color with the shortest wavelength,
a shortest distance between the channel region of the thin film transistor that is connected to the pixel electrode facing the coloring layer of the primary color with the shortest wavelength and the pixel electrode facing the coloring layer of the primary color with the shortest wavelength is greater than a shortest distance between the channel region of the thin film transistor that is connected to the one of the pixel electrodes and the one of the pixel electrodes, and
a shortest distance between the channel region of the thin film transistor that is connected to another one of the pixel electrodes adjacent in the predetermined direction to the pixel electrode facing the coloring layer of the primary color with the shortest wavelength and the pixel electrode facing the coloring layer of the primary color with the shortest wavelength is greater than or equal to a shortest distance between the channel region of the thin film transistor that is connected to the pixel electrode facing the coloring layer of the primary color with the shortest wavelength and the pixel electrode facing the coloring layer of the primary color with the shortest wavelength.

2. The liquid crystal display panel according to claim 1, wherein
the predetermined direction is an extension direction of the plurality of scanning signal lines, and
a shortest distance between the channel region of the thin film transistor that is connected to another one of pixel electrodes adjacent in the extension direction of the plurality of scanning signal lines to the pixel electrode facing the coloring layer of the primary color with the shortest wavelength and the pixel electrode facing the coloring layer of the primary color with the shortest wavelength is greater than a shortest distance between the channel region of the thin film transistor that is connected to the pixel electrode facing the coloring layer of the primary color with the shortest wavelength and the pixel electrode facing the coloring layer of the primary color with the shortest wavelength.

3. The liquid crystal display panel according to claim 2, wherein the thin film transistor connected to the pixel electrode facing the coloring layer of the primary color with the shortest wavelength and the thin film transistor connected to the other one of the pixel electrodes are disposed in positions facing each other with corresponding video signal lines sandwiched therebetween, the corresponding video signal lines being connected to the thin film transistors, respectively.

4. The liquid crystal display panel according to claim 1, wherein
the predetermined direction is an extension direction of the plurality of video signal lines, and
a shortest distance between the channel region of the thin film transistor that is connected to another one of pixel electrodes adjacent in the extension direction of the plurality of video signal lines to the pixel electrode facing the coloring layer of the primary color with the shortest wavelength and the pixel electrode facing the coloring layer of the primary color with the shortest wavelength is equal to a shortest distance between the channel region of the thin film transistor that is connected to the pixel electrode facing the coloring layer of the primary color with the shortest wavelength and the pixel electrode facing the coloring layer of the primary color with the shortest wavelength.

5. The liquid crystal display panel according to claim 1, wherein a light-shielding layer is disposed in a position facing each thin film transistor.

6. The liquid crystal display panel according to claim 1, wherein the coloring layers are disposed on the second substrate.

7. The liquid crystal display panel according to claim 1, wherein each coloring layer is disposed on a pixel electrode facing the coloring layer.

8. The liquid crystal display panel according to claim 1, wherein the primary color with the shortest wavelength is blue.

9. The liquid crystal display panel according to claim 8, wherein the color image is displayed based on red, green, and blue.

10. The liquid crystal display panel according to claim 8, wherein the color image is displayed based on red, green, blue, and yellow.

11. A liquid crystal display device comprising a liquid crystal display panel according to claim 1.

12. The liquid crystal display panel according to claim 1, wherein the oxide semiconductor includes indium, gallium, zinc, and oxygen.

13. A liquid crystal display panel for displaying a color image based on a predetermined number of primary colors, the liquid crystal display panel comprising:
a first substrate and a second substrate facing each other;
a liquid crystal layer sandwiched between the first substrate and the second substrate;
a plurality of video signal lines and a plurality of scanning signal lines disposed to intersect each other on the first substrate;
a plurality of pixels disposed in a matrix form along the plurality of video signal lines and the plurality of scanning signal lines; and
coloring layers of the predetermined number of primary colors, wherein
each of the pixels includes a plurality of subpixels associated with the predetermined number of primary colors, respectively,
each of the subpixels includes:
a thin film transistor including a source electrode electrically connected to a corresponding one of the plurality of video signal lines disposed along the subpixel, a gate electrode electrically connected to a corresponding one of the plurality of scanning signal lines disposed along the subpixel, a gate insulating film provided on the gate electrode, and a channel layer made of an oxide semiconductor and provided on the gate insulating film; and
a pixel electrode connected to the thin film transistor and facing a corresponding coloring layer of a primary color associated with the subpixel,
in each of the pixels, the pixel electrodes of the plurality of subpixels are arranged in a predetermined direction,
the channel layer includes a channel region corresponding to a region where the channel layer is overlapped with the gate electrode,
one of the thin film transistors connected to one of pixel electrodes adjacent in the predetermined direction to a pixel electrode facing a coloring layer of a primary color with a shortest wavelength among the predetermined number of primary colors is disposed on an opposite side of the one of the pixel electrodes from the pixel electrode facing the coloring layer of the primary color with the shortest wavelength,
a shortest distance between opposing edges of: (i) the channel region of the thin film transistor that is connected to the pixel electrode facing the coloring layer of the primary color with the shortest wavelength and (ii) the pixel electrode facing the coloring layer of the primary color with the shortest wavelength is greater than a shortest distance between opposing edges of: (i) the channel region of the thin film transistor that is connected to the one of the pixel electrodes and (ii) the one of the pixel electrodes, and
a shortest distance between opposing edges of: (i) the channel region of the thin film transistor that is connected to another one of the pixel electrodes adjacent in the predetermined direction to the pixel electrode facing the coloring layer of the primary color with the shortest wavelength and (ii) the pixel electrode facing the coloring layer of the primary color with the shortest wavelength is greater than or equal to a shortest distance between opposing edges of: (i) the channel region of the thin film transistor that is connected to the pixel electrode facing the coloring layer of the primary color with the shortest wavelength and (ii) the pixel electrode facing the coloring layer of the primary color with the shortest wavelength.

14. The liquid crystal display panel according to claim 13, wherein a light-shielding layer is disposed in a position facing each thin film transistor.

15. A liquid crystal display device comprising a liquid crystal display panel according to claim 13.

16. The liquid crystal display panel according to claim 13, wherein the oxide semiconductor includes indium, gallium, zinc, and oxygen.

17. A liquid crystal display panel for displaying a color image based on a predetermined number of primary colors, the liquid crystal display panel comprising:
a first substrate and a second substrate facing each other;
a liquid crystal layer sandwiched between the first substrate and the second substrate;
a plurality of video signal lines and a plurality of scanning signal lines disposed to intersect each other on the first substrate;
a plurality of pixels disposed in a matrix form along the plurality of video signal lines and the plurality of scanning signal lines; and coloring layers of the predetermined number of primary colors, wherein each of the pixels includes a plurality of subpixels associated with the predetermined number of primary colors, respectively, each of the subpixels includes:
- a thin film transistor including a source electrode electrically connected to a corresponding one of the plurality of video signal lines disposed along the subpixel, a gate electrode electrically connected to a corresponding one of the plurality of scanning signal lines disposed along the subpixel, a gate insulating film provided on the gate electrode, and a channel layer made of an oxide semiconductor and provided on the gate insulating film; and
- a pixel electrode connected to the thin film transistor and facing a corresponding coloring layer of a primary color associated with the subpixel, in each of the pixels, the pixel electrodes of the plurality of subpixels are arranged in a predetermined direction, the channel layer includes a channel region corresponding to a region where the channel layer is overlapped with the gate electrode, one of the thin film transistors connected to one of pixel electrodes adjacent in the predetermined direction to a pixel electrode facing a coloring layer of a primary color with a shortest wavelength among the predetermined number of primary colors is disposed on an opposite side of the one of the pixel electrodes from the pixel electrode facing the coloring layer of the primary color with the shortest wavelength, a shortest distance between the channel region of the thin film transistor that is connected to the pixel electrode facing the coloring layer of the primary color with the shortest wavelength and the pixel electrode facing the coloring layer of the primary color with the shortest wavelength is greater than a shortest distance between the channel region of the thin film transistor that is connected to the one of the pixel electrodes and the one of the pixel electrodes, a shortest distance between the channel region of the thin film transistor that is connected to another one of the pixel electrodes adjacent in the predetermined direction to the pixel electrode facing the coloring layer of the primary color with the shortest wavelength and the pixel electrode facing the coloring layer of the primary color with the shortest wavelength is greater than or equal to a shortest distance between the channel region of the thin film transistor that is connected to the pixel electrode facing the coloring layer of the primary color with the shortest wavelength and the pixel electrode facing the coloring layer of the primary color with the shortest wavelength, and the channel regions of the thin film transistor of each of the subpixels have same sizes.

18. The liquid crystal display panel according to claim 17, wherein a light-shielding layer is disposed in a position facing each thin film transistor.

19. A liquid crystal display device comprising a liquid crystal display panel according to claim 17.

20. The liquid crystal display panel according to claim 17, wherein the oxide semiconductor includes indium, gallium, zinc, and oxygen.

* * * * *